US012638399B2

(12) United States Patent
Stensrud et al.

(10) Patent No.: US 12,638,399 B2
(45) Date of Patent: May 26, 2026

(54) METHOD FOR DETERMINING TOTAL ALDEHYDES IN ONE OR MORE OF CRUDE 2,5-FURANDICARBOXYLIC ACID (FDCA), CRUDE TEREPHTHALIC ACID (TPA) AND ESTERS OF THESE

(71) Applicant: Archer Daniels Midland Company, Decatur, IL (US)

(72) Inventors: Kenneth F. Stensrud, Decatur, IL (US); William Chris Hoffman, Decatur, IL (US)

(73) Assignee: ARCHER-DANIELS-MIDLAND COMPANY, Decatur, IL (US)

( * ) Notice: Subject to any disclaimer, the term of this patent is extended or adjusted under 35 U.S.C. 154(b) by 295 days.

(21) Appl. No.: 18/000,647

(22) PCT Filed: May 26, 2021

(86) PCT No.: PCT/US2021/034237
§ 371 (c)(1),
(2) Date: Dec. 2, 2022

(87) PCT Pub. No.: WO2021/247319
PCT Pub. Date: Dec. 9, 2021

(65) Prior Publication Data

US 2024/0060902 A1 Feb. 22, 2024

Related U.S. Application Data

(60) Provisional application No. 63/034,827, filed on Jun. 4, 2020.

(51) Int. Cl.
*G01N 21/78* (2006.01)
*G01N 21/33* (2006.01)
*G01N 31/22* (2006.01)

(52) U.S. Cl.
CPC ............ *G01N 21/78* (2013.01); *G01N 21/33* (2013.01); *G01N 31/22* (2013.01)

(58) Field of Classification Search
None
See application file for complete search history.

(56) References Cited

U.S. PATENT DOCUMENTS 3,646,125 A * 2/1972 Berthoux ................ C07C 51/42 562/486
10,538,499 B2 * 1/2020 Howard ................. C08G 63/80

OTHER PUBLICATIONS

Miyashita et al., "A simple and quick determination of aldehydes in autoxidized vegetable and fish oils", Journal of the American Oil Chemists' Society, 1991, Vo. 68, No. 10, pp. 748-751. (Year: 1991).*

* cited by examiner

*Primary Examiner* — Matthew D Krcha
(74) *Attorney, Agent, or Firm* — Jesse S. Harper

(57) ABSTRACT

A process is described for the determination of soluble aldehydes in a composition including one or more of (a) 2,5-furandicarboxylic acid (FDCA), (b) terephthalic acid (TPA), (c) an ester of 2,5-furandicarboxylic acid and (d) an ester of terephthalic acid. The process can indicate the presence in the composition of even those very low levels of such soluble aldehydes that have been associated with the development of unacceptable color in a) the composition, b) some portion of the composition or c) a prepolymer, oligomer or polymer prepared, directly or indirectly, at least in part from the composition or some portion of the composition, so that mitigating or corrective measures can be undertaken in response.

27 Claims, No Drawings

METHOD FOR DETERMINING TOTAL ALDEHYDES IN ONE OR MORE OF CRUDE 2,5-FURANDICARBOXYLIC ACID (FDCA), CRUDE TEREPHTHALIC ACID (TPA) AND ESTERS OF THESE

CROSS-REFERENCE TO RELATED APPLICATIONS

This application is a national stage entry of International Application No. PCT/US21/34237, filed May 26, 2021, which itself claims priority to U.S. Provisional Patent Application No. 63/034,827, filed Jun. 4, 2020, the contents of each are incorporated herein by reference.

FIELD OF THE INVENTION

The present invention relates, from one perspective, to processes for making 2,5-furandicarboxylic acid (FDCA) and its esters, such as its dimethyl ester derivative (FDME), and to the polymers that can be made from these materials. From another perspective, the present invention relates to making the conventional petroleum-based terephthalic acid (TPA) for which FDCA has been proposed as a plant-based, renewable alternative and to the polymers that can be made therefrom.

BACKGROUND OF THE INVENTION

The depletion of fossil fuels has created major incentives for seeking alternative sources to petroleum-based carbon for the synthesis of so-called "platform" molecules that can serve as the building blocks for commercially significant products. Biomass is currently viewed as a potential replacement from which many such high value chemicals can be derived, but the development of sustainable technologies for the production of such chemicals from renewable resources remains a significant challenge.

The bio-based monomers, 2,5-furandicarboxylic acid (FDCA) and its dimethyl ester derivative, 2,5-furandicarboxylic acid dimethyl ester (FDME) are recognized as important starting materials in the production of poly(alkylene furan dicarboxylate) polymers that can substitute for their known, mass-produced petroleum derived analogs, namely poly(alkylene terephthalate) polymers, such as polyethylene terephthalate (PET). A prominent example of a poly(alkylene furan dicarboxylate) polymer is poly(ethylene furan dicarboxylate), or PEF, obtained by reaction of FDCA or FDME with ethylene glycol. The bio-based polymer (bio-plastic) PEF exhibits superior properties in a number of respects, relative to its petroleum derived analog PET, particularly in the area of packaging. For example, blends of PEF and PET can provide improved barrier properties with respect to $CO_2$ and $O_2$, prolonging shelf life over that obtained with pure PET and providing an acceptable container for products such as beer that are susceptible to oxidative degradation. Other packaging applications of PEF include films used to manufacture pouches, wrappers, and heat shrink materials having high mechanical strength and recyclability.

In general, both FDCA and FDME are useful platform molecules in the production of polyamides, polyurethanes, and polyesters having diverse applications as plastics, fibers, coatings, adhesives, personal care products, and lubricants. The commercial significance of these molecules is evidenced, for example, in a 2004 study by the U.S. Department of Energy, identifying FDCA as one of twelve priority chemicals for establishing the "green" chemical industry of the future. Due to its structural similarity to terephthalic acid (TPA), the potential of FDCA as a substitute monomer for synthesizing polyesters has been recognized at least as early as 1946, for example in GB621971A, and a number of parties have invested significant effort over a number of years toward achieving a commercially viable process to manufacture FDCA.

In terms of FDCA synthesis from bio-based starting materials, advancements are described in U.S. Pat. No. 10,538,499, according to which a feed comprising a six-carbon sugar unit (e.g., fructose) is subjected to integrated processing steps, the first of which is a dehydrating step to provide 5-hydroxymethylfurfural (HMF) and/or certain HMF derivatives, such as its ester or ether derivatives. The dehydration product comprising such materials is then oxidized to the desired FDCA, according to a similar Mid-Century type oxidation as employed for the oxidation of p-xylene to make TPA, using a homogeneous catalyst system including cobalt, manganese and bromine components.

U.S. Pat. No. 9,029,580 discloses a process to produce a dry purified carboxylic acid product comprising furan-2,5-dicarboxylic acid (FDCA). The process comprises oxidizing at least one oxidizable compound such as 5-(hydroxymethyl) furfural (5-HMF) to produce product with lesser amounts of 5-formyl furan-2-carboxylic acid (FFCA).

US Pub. 20190352784 discloses a process for treating a furan-2,5-dicarboxylic acid composition by using an electrochemical cell to electrochemically reduce carbonyl groups such as the aldehyde group in the same impurity, 5-formyl-furan-2-carboxylic acid (FFCA).

Tachibana et al., "Plant-based Poly(Schiff-Base) Composed of Bifurfural," ACS Omega, 2018 May 18, 3 (5): 5336-45, discloses forming poly(Schiff base) s composed of bifurfural and diamines as a desired polymer product.

A method for quantitative determination of aldehydes in oxidized oils based on the reaction of N,N-dimethyl-p-phenylenediamine (DPPD) with aldehydes in the presence of acetic acid is disclosed by Miyashita et al., Journal of the American Oil Chemist's Society (JAOCS), Vol. 68, no. 10, pp. 748-751 (October 1991). The method uses benzene as the solvent for the aldehyde solution, and the lowest amount of aldehydes determined calculates to 39 ppm.

WO 2019/014382 discloses a process for producing a purified 2,5-furandicarboxylic acid (FDCA) pathway product comprising: contacting an FDCA pathway product comprising FDCA and 5-formyl-furan-2-carboxylic acid (FFCA) with hydrogen in the presence of a heterogeneous reduction catalyst and a solvent under conditions sufficient to form a reaction mixture for reducing the FFCA to hydroxymethylfurancarboxylic acid (HMFCA), and producing a purified FDCA pathway product; wherein the purified FDCA pathway product comprises FDCA, HMFCA, less than 10 mol percent of remaining FFCA impurity, less than 10 mol percent of 5-methyl-2-furoic acid (MFA), and less than 10 mol percent of tetrahydrofuran-2,5-dicarboxylic acid (THFDCA); wherein the solvent is a multi-component solvent comprising water and a water-miscible aprotic organic solvent; and wherein the heterogeneous reduction catalyst comprises a solid support and a metal selected from the group consisting of Cu, Ni, Co, Pd, Pt, Ru, Ag, Au, Rh, Os, Ir, and any combination thereof.

Despite extensive efforts, the commercial production of FDCA has not yet been realized and improvements in bio-based synthesis routes to FDCA and its derivatives are continually being sought, in an effort to establish economic viability on the commercial scale.

SUMMARY

In a first aspect, the present invention relates to a process for the determination of soluble aldehydes in a composition, wherein the composition comprises one or more of (a) 2,5-furandicarboxylic acid (FDCA), (b) terephthalic acid (TPA), (c) an ester of 2,5-furandicarboxylic acid and (d) an ester of terephthalic acid, and wherein the process itself comprises combining one or more diamine salts with the composition under conditions suitable for causing soluble aldehydes present in the composition to react with the added diamine and form one or more imines, then analyzing the composition for the imines. In certain embodiments, the process enables substantially quantitatively determining the total amount of soluble aldehydes present in the composition.

In another aspect, the present invention relates to the use of such an analytical process for monitoring for the presence of an amount of soluble aldehydes in the composition that exceeds a certain threshold value associated with the development of unacceptable color in a) the composition, b) some portion of the composition or c) a prepolymer, oligomer or polymer prepared, directly or indirectly, at least in part from the composition or some portion of the composition, and when the threshold value is exceeded, making an alteration to the manner in which the composition or portion of the composition is formed, treating the composition or portion of the composition or undertaking both an alteration of the manner in which the composition or portion of the composition is formed and a treatment of the composition or portion of the composition, to prevent the development of that unacceptable color. In certain embodiments, these corrective measures may embrace one or more of altering the manner of oxidizing one or more oxidation precursors of FDCA or TPA to form the FDCA or TPA, respectively, treating the composition or a portion thereof by introducing one or more color-stabilizing additives thereto and carrying out a hydrogenation of the composition or a portion thereof.

In this regard, processes to produce TPA or esters of TPA have long been known to entail conditions conducive to the formation of problematic side products, including labile aldehydes that are well-known color formers. A known principal example of such a color former that must be dealt with in the production of TPA or of esters of TPA is 4-carboxybenzaldehyde (hereafter, 4-CBA). Labile aldehydes are, however, also a problem for the production of FDCA or esters of FDCA. For example, one aldehyde in particular, 5-formyl-2-furancarboxylic acid methyl ester (FFME), can be present in amounts upwards of 1 wt. % in crude mixtures from the Mid-Century-type oxidation of one or more furanic precursors of FDCA obtained from the acid-catalyzed dehydration of hexoses (e.g., fructose) and possesses physical properties nearly identical to FDME, hence posing a purification challenge. Further, in controlled experiments where FFME was spiked into FDME mixtures at low ppm quantities, substantial color was observed over short time intervals at temperatures just above the melting point for FDME. Instrument methods, such as GC-FID, GC/MS, LC-PDA and LC/MS are certainly capable of quantifying known organic compounds, including aldehydes, at low ppm levels, but these methods cannot accurately account for all of the various, unknown molecular species that have been produced alongside 5-formyl-2-furandicarboxylic acid in the recent efforts to develop a commercially viable process for producing monomer-purity FDCA and/or FDME; the present invention thus can be broadly understood as concerned in its first aspect with providing a method that can rapidly account for the presence of very small amounts of the aldehydes, known and unknown, that can be found in compositions comprised of one or more of FDCA, esters of FDCA with an alcohol, TPA and esters of TPA with an alcohol, and in its second aspect with efficiently and effectively taking corrective action when the analytical method of the present invention indicates such corrective action is needed to prevent the development (or eventual development) of unwanted color in the compositions or in materials or articles made from the compositions.

In an embodiment, the composition so analyzed or monitored is the crude FDCA product from the oxidation of one or more furanic precursors of FDCA.

In another embodiment, the composition so analyzed or monitored is the crude TPA product from the oxidation of p-xylene.

In yet another embodiment, the composition so analyzed or monitored is a mixed monomer composition comprising both FDCA and TPA from the oxidation in the same or in different reactors of one or more furanic precursors of FDCA and p-xylene, respectively. In a particular embodiment, the mixed monomer composition is that formed by a concurrent oxidation in the same reactor under a unitary set of reaction conditions of the one or more furanic precursors of FDCA and p-xylene, as described in commonly-assigned U.S. Provisional Patent Application Ser. No. 63/025,345, filed on May 15, 2020 for "Co-Production Of Monomers, Including At Least One Bio-Based Monomer".

In still other embodiments, the composition so analyzed or monitored is that resulting from an esterification with one or more alcohols of the crude FDCA product from the oxidation of one or more furanic precursors of FDCA, of the crude TPA product from the oxidation of p-xylene or a combination of both FDCA and TPA from the oxidation in the same or in different reactors of one or more furanic precursors of FDCA and p-xylene, respectively. In the esterification of such a combination of both FDCA and TPA, in a particular embodiment, the combination to be esterified is that mixed monomer composition formed by a concurrent oxidation in the same reactor under a unitary set of reaction conditions of the one or more furanic precursors of FDCA and p-xylene, as described in commonly-assigned United States Provisional Patent Application Ser. No. 63,025,345, filed on May 15, 2020 for "Co-Production Of Monomers, Including At Least One Bio-Based Monomer".

In certain embodiments, the analysis or monitoring is done on a real-time basis with in-process materials from the synthesis of one or more of FDCA, TPA, an ester or esters of FDCA and an ester or ester of TPA.

In certain embodiments, the analysis or monitoring is done on a real-time basis with in-process materials and the making of an alteration to the manner in which the composition or portion of the composition is formed, the treating the composition or portion of the composition or undertaking of both an alteration of the manner in which the composition or portion of the composition is formed and a treatment of the composition or portion of the composition also occurs on a real-time basis responsive to the results of the analysis or monitoring.

These and other aspects, embodiments, and associated advantages will become apparent from the following Detailed Description.

DETAILED DESCRIPTION OF EMBODIMENTS

The terms "wt-%", "wt-ppm," and "wt-ppb," as used herein, are used to designated percentage by weight, parts per million by weight, and parts per billion by weight, respectively. The term “mol-%” is used to designate a molar percentage. Unless otherwise indicated, the phrase “being (or is) substantially free of,” can mean, in various embodiments, “having (or has) less than 5 wt-% of,” “having (or has) less than 3 wt-% of,” or “having (or has) less than 1 wt-% of.” In the case of references to “byproducts” such as aldehyde byproducts specifically, and color-forming byproducts generally, these may alternatively be referred to as “contaminants” or “impurities,” for example in subject matter being incorporated by reference.

The term “FDCA” means 2,5-furandicarboxylic acid (FDCA). An “esterified derivative” of FDCA means a derivative whereby either or both of the carboxylic acid groups of this compound are instead ester groups, such as alkyl ester groups or aryl ester groups, with methyl ester groups, ethyl ester groups, or phenyl ester groups being specific examples. In the case of methyl ester groups, the desired esterified derivative of FDCA for use in forming polyesters such as with ethylene glycol (PEF) is 2,5-furandicarboxylic acid, dimethyl ester (FDME).

As will be apparent from the foregoing summary and from the following description, while the terms “soluble aldehyde(s)”, “aldehyde(s)”, “labile aldehydes”, “aldehyde derivative(s)” and the like are all used herein, those of skill in the art will understand that these all essentially refer comprehensively to those compounds having at least one aldehyde group present therein for reacting with the diamine salts in the inventive method (or indeed to the aldehyde functional groups themselves), to provide a corresponding at least one imine group that can be found analytically as described herein.

An “aldehyde derivative” of FDCA, for example, means a derivative whereby one of the carboxylic acid groups of this compound is instead an aldehyde group, such as a formyl group that is bonded directly to the furan ring or a formylalkyl group that is bonded through an intervening alkyl group, with a formyl group, a formylmethyl group, or a formylethyl group being specific examples. In the case of a formyl group, the aldehyde derivative of FDCA that is most particularly and principally of concern for the present invention is 5-formyl-2-furancarboxylic acid (FFCA), though other, perhaps unidentified (to the practitioner) lower aldehyde derivatives will certainly also be of concern for the formation of undesirable color by a process of aldol condensation (as explained above).

An “aldehyde derivative” of an esterified derivative of FDCA correspondingly thus means an esterified derivative of FDCA as defined above, whereby one of the ester groups of this derivative is instead an aldehyde group, such as a formyl group that is bonded directly to the furan ring or a formylalkyl group that is bonded through an intervening alkyl group, with a formyl group, a formylmethyl group, or a formylethyl group being specific examples. In the case of a formyl group, and the esterified derivative of FDCA being FDME, the aldehyde derivative of FDME that will be particularly and principally of concern for purposes of the present invention is 5-formyl-2-furancarboxylic acid methyl ester (FFME), though again other, perhaps unidentified aldehyde derivatives of other esterified derivatives of FDCA will likewise be of concern for the formation of undesirable color by aldol condensation.

The present invention as summarized above is principally concerned with processes for making 2,5-furandicarboxylic acid (FDCA), though in certain embodiments the FDCA is made in combination with other monomers, such as terephthalic acid (TPA). Certain of these processes in turn expressly include “esterifying” the FDCA or the combined dicarboxylic acids (FDCA and TPA) to form ester derivatives of FDCA or of FDCA and TPA, whereby one or preferably both of the carboxylic acid groups of these dicarboxylic acids are instead ester groups, such as alkyl ester groups (in the case of a mono- or dialkyl ester derivative) or aryl ester groups (in the case of a mono- or diaryl ester derivative), with methyl ester groups, ethyl ester groups, or phenyl ester groups being specific examples. In the case of methyl ester groups, the preferred ester derivative of FDCA is 2,5-furandicarboxylic acid, dimethyl ester (FDME) and the ester derivative of TPA is dimethyl terephthalate (DMT), which can be formed by reaction of FDCA and TPA, respectively, with sufficient quantities of methanol.

Real-Time Quantitation of Aldehydes and Aldehyde Derivatives

In contemplating the use of these materials for making various polymers, as indicated previously color- or more precisely the absence of color—is a critical attribute in respect of the commercial acceptability of these materials and of the polymers prepared therefrom, for a number of applications. For example, PET is very widely used in the manufacture of carbonated soft drink bottles, and it is understood that bottles prepared at least in part from PEF will need to be substantially colorless to be acceptable, at least partly plant-based alternatives to the PET bottles that they have become accustomed to purchasing. As related above, we have found that very small amounts of various aldehyde group-containing materials (and of combinations (including dimers, trimers etc) of these materials that form by aldol condensation) inclusive of, but not limited to, FFCA/FFME that are made in the various processes that have been described in the art for making FDCA (or FDME) can contribute to the development of unacceptable color in FDCA/FDME and in polymers (such as PEF) made therefrom. Accordingly, in one aspect of the present invention, a novel process has been developed and is disclosed herein which enables for all such aldehyde and aldehyde derivative byproducts to be quantitatively accounted for, for example, in an FDCA-containing composition from the oxidation of one or more oxidative precursors of FDCA, in an FDCA ester-containing composition from the subsequent esterification of that same FDCA-containing composition, in a TPA-containing composition from the oxidation of p-xylene, in a TPA ester-containing composition from the subsequent esterification of that same TPA-containing composition, a mixed monomer composition comprising both of FDCA and TPA or a composition comprising ester products from an esterification conducted on the mixed monomer composition.

The process provided herein includes a highly sensitive protocol that uses a diamine, such as N,N'-dimethylphenylenediamine (DPPD), as an agent that derivatizes virtually all aldehydes to stable, long-wavelength absorbing imines that can be detected by UV-Vis analysis in sub ppm (nanomolar) amounts, and that can be performed and provide a quantitative result in sufficiently rapid fashion that the method could be used on a real time basis and for online process control or real time mitigation of excess aldehydes (as precursors of color formation, where “aldehydes” is again broadly understood as embracing aldehyde derivatives of, for example, FDCA, esters of FDCA, TPA and esters of TPA) being found in an analyzed or monitored composition. In one particular embodiment, the process disclosed herein may be used to determine the presence of total aldehydes in excess of 30 ppm in a crude 2,5-furandicarboxylic acid composition, wherein the composition is formed by the oxidation of one or more furanic precursors of 2,5-furandicarboxylic acid. In another embodiment, the process may be used to determine the presence of total aldehydes in excess of 10 ppm in a crude 2,5-furandicarboxylic acid composition. In yet another embodiment, the process may be used to determine the presence of total aldehydes in excess of 30 ppb in a crude 2,5-furandicarboxylic acid composition.

The following chemical equation shows the formation of imine adducts from N,N'-Dimethyl-p-Phenylenediamine (DPPD) that occurs with the aldehydes in compositions according to a process of the present invention:

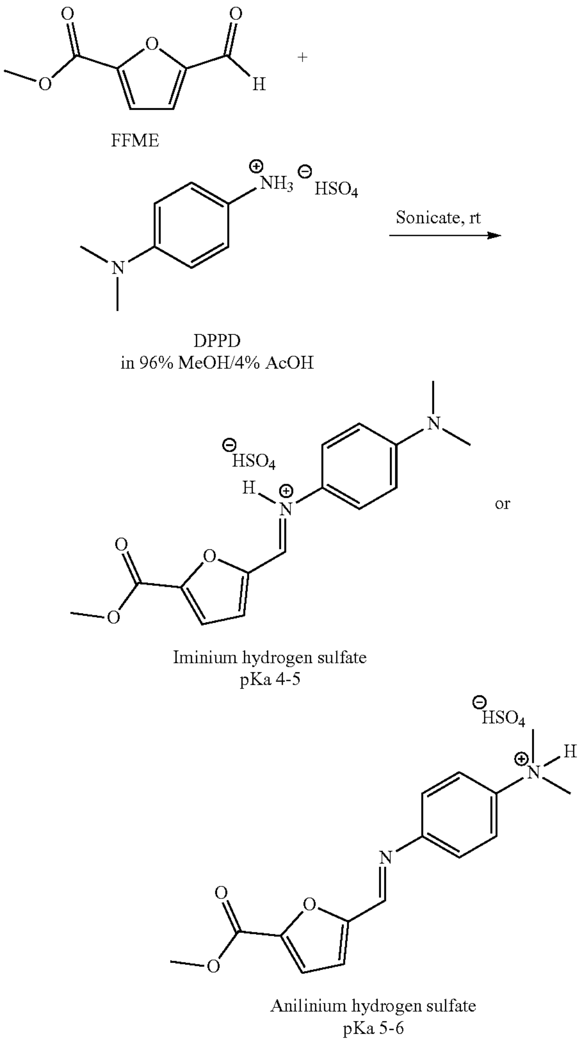

Adducts are Schiff base salts, highly colored, and absorb strongly at long wavelengths.

The following are diamine salts (formulas i through x) that may also be used in accordance with the present invention, to provide the UV-Vis detectable imines:

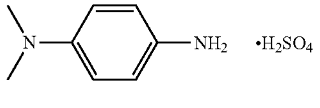
i)

N,N'-dimethyl-p-phenylenediamine sulfate (DPPD sulfate);

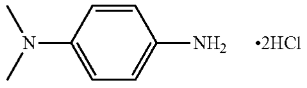
ii)

N,N'-dimethyl-p-phenylenediamine dihydrogen chloride (DPPD dihydrogen chloride);

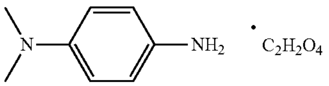
iii)

N,N'-dimethyl-p-phenylenediamine oxalate (DPPD oxalate);

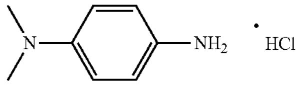
iv)

N,N'-dimethyl-p-phenylenediamine hydrogen chloride (DPPD hydrogen chloride);

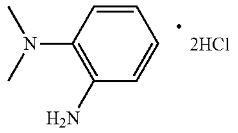
v)

N,N'-dimethyl-o-phenylenediamine dihydrogen chloride (DOPD dihydrogen chloride);

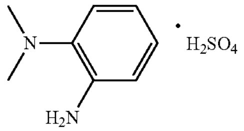
vi)

N,N'-dimethyl-o-phenylenediamine sulfate (DOPD sulfate);

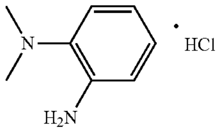
vii)

N,N'-dimethyl-o-phenylenediamine hydrogen chloride (DOPD hydrogen chloride);

viii)

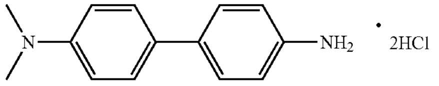

N,N'-dimethyl-p-phenylenediamine dihydrogen chloride (DPBD dihydrogen chloride);

ix)

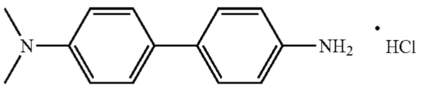

N,N'-dimethyl-p-phenylenediamine hydrogen chloride (DPBD hydrogen chloride);

x)

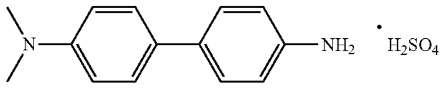

N,N'-dimethyl-p-phenylenediamine sulfate (DPBD sulfate).

Diamine salts i-vii are commercially available. Diamine salts viii, ix, x may be readily prepared. Exemplary, non-limiting methods for the preparation of diamine salts viii, ix, and x and are provided below, along with comments regarding their subsequent iminization with aldehydes that may be present in a composition to be quantitatively analyzed according to the present invention.

This subsequent derivatization to the UV-Vis detectable imines can be conveniently accomplished at room temperature. We have found that certain solvents should be particularly preferred for carrying out the reaction, while other commonly used industrial solvents-namely benzene, toluene (produced a greenish color), xylene, ethyl acetate, acetone, THF (produced a purple color), acetonitrile, methanol, and ethanol-should not be selected for use. Methylene chloride and chloroform in particular appear to work very well.

Preparation of Diamine Salt viii)—N,N'-dimethyl-p-phenylenediamine dihydrogen chloride (DPBD dihydrogen chloride) from DPBD

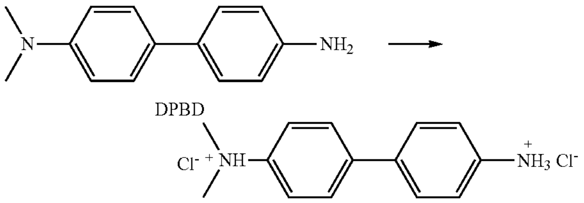

DPBD

DPBD dihydrogen chloride

Procedure: DPBD is converted to DPBD dihydrogen chloride as follows.

A 50 mL round bottomed flask equipped with a PTFE coated magnetic stir bar is charged with 1 g of N,N'-dimethyl-p-phenylenediamine (4.70 mmol) and 100 mL of a 0.1 molar solution of ethanolic HCl. The resulting mixture is vigorously stirred overnight, and then excess solvent is removed under pressure, first by rotary evaporation (50° C., 25 torr), then under high vacuum (<1 torr) for two days, affording 1.3 g of DPBD dihydrogen chloride as a crystalline solid.

Iminization with FFME: A rapid reaction occurs when FFME and DPBD dihydrogen chloride are mixed, furnishing the adduct listed below (formula xi). This species will exhibit $\lambda_{max}$>500 nm (Spectroscopy Letters (1998), 31 (5), 1107-1122), which is advantageous in that it distinguishes markedly from any soluble furan oligomer in the mixture that possess $\lambda_{max}$ approaching 400 nm (near the DPPD adduct).

xi)

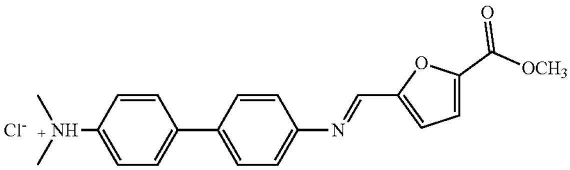

Preparation of Diamine Salt ix)—N,N'-dimethyl-p-phenylenediamine hydrogen chloride (DPBD hydrogen chloride) from DPBD

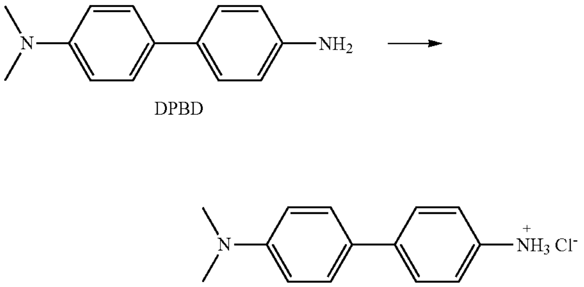

DPBD

DPBD hydrogen chloride

Procedure: DPBD is converted to DPBD hydrogen chloride as follows.

A 50 mL round bottomed flask equipped with a PTFE coated magnetic stir bar is charged with 1 g of N,N'-dimethyl-p-phenylenediamine (4.70 mmol) and 100 mL of a 0.047 molar solution of ethanolic HCl. The resulting mixture is vigorously stirred overnight, and then excess solvent is removed under pressure, first by rotary evaporation (50° C., 25 torr), then under high vacuum (<1 torr) for two days, affording 1.2 g of DPBD hydrogen chloride as a crystalline solid.

Iminization with FFME: A rapid reaction occurs when FFME and DPBD hydrogen chloride are mixed, furnishing the adduct listed below (formula xii). This species will exhibit $\lambda_{max}$>500 nm (Spectroscopy Letters (1998), 31 (5), 1107-1122), which is advantageous in that it distinguishes markedly from any soluble furan oligomer in the mixture that possess exhibit $\lambda_{max}$ approaching 400 nm (near the DPPD adduct).

xii)

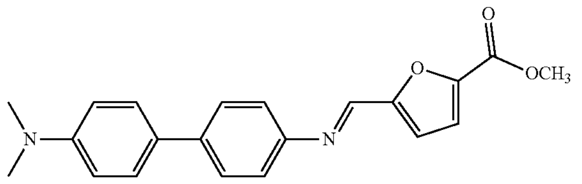

Preparation of Diamine Salt x)—N,N'-dimethyl-p-phenylenediamine sulfate (DPBD sulfate) from DPBD

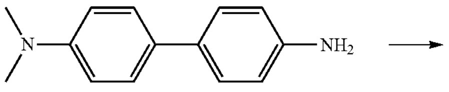

DPBD

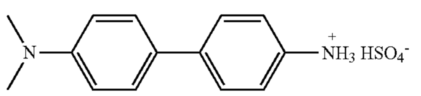

DPBD sulfate

Procedure: DPBD is converted to DPBD sulfate as follows.

A 50 mL round bottomed flask equipped with a PTFE coated magnetic stir bar is charged with 1 g of N,N'-dimethyl-p-phenylenediamine (4.70 mmol) and 100 mL of a 0.047 molar solution of ethanolic $H_2SO_4$. The resulting mixture is vigorously stirred overnight, and then excess solvent is removed under pressure, first by rotary evaporation (50° C., 25 torr), then under high vacuum (<1 torr) for two days, affording 1.5 g of DPBD sulfate as a crystalline solid.

Iminization with FFME: A rapid reaction occurs when FFME and DPBD sulfate are mixed, furnishing the adduct listed below (formula xiii). This species will exhibit $\lambda_{max}$>500 nm (Spectroscopy Letters (1998), 31 (5), 1107-1122), which is advantageous in that it distinguishes markedly from any soluble furan oligomer in the mixture that possess exhibit $\lambda_{max}$ approaching 400 nm (near the DPPD adduct).

xiii)

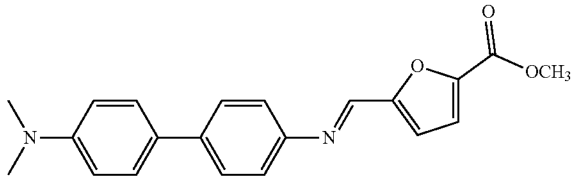

Those skilled in the art having the benefit of the present disclosure will recognize that other diamine salts can be prepared and used in the methods disclosed herein. These other diamine salts would differ solely by type and position of substituents, while keeping the two amine groups ortho and para to one another.

The following are the formulas of FDCA and FDME.

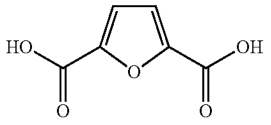

2,5-furandicarboxylic acid (FDCA)

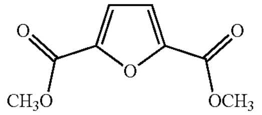

furandicarboxylic dimethyl ester (FDME)

Undesirable color forming carbonyl compounds (aldehydes) in FDCA and FFME compositions are shown in the formulas below.

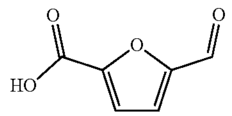

5-forymyl-2-furancarboxylic acid (FFCA)

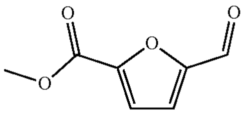

Methyl-5-formyl-2-furandicaroxylate (FFME)

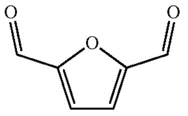

2,5-diformylfuran (DFF)

The following are the formulas for TPA and DMT.

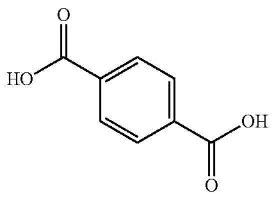

Terephthalic acid (TPA)

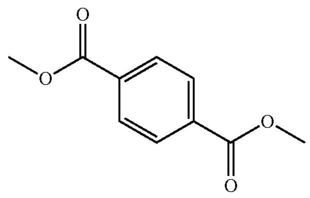

Dimethyl terephthalate (DMT)

Undesirable color forming aldehydes in TPA and DMT compositions are shown in the formulas below.

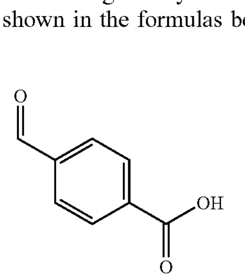

4-carboxybenzaldehyde (4-CBA)

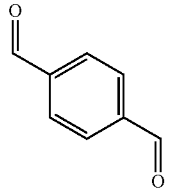

Terephthaldehyde (also referred to as 1,4-formylbenzene)

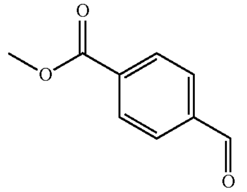

Methyl-4-formylbenzoate (also referred to as 4-carbomethoxybenzaldehyde)

Disclosed herein is a viable, rapid technique to determine ultra-low levels of such problematic aldehydes; in certain embodiments using methylene chloride or chloroform, the presence of carbonyl compounds in excess of 30 ppb can be determined. Without being bound by theory, it is expected that the total time for diamine (e.g., DPPD) derivatization is actually significantly shorter than indicated in the above merely illustrative procedures, as the reaction to make the imine is a speedy reaction.

After determination of total aldehydes in a subject composition, an appropriate approach(es) may be taken to mitigate color formation and/or improve color stability in the subject composition.

Mitigation of Aldehydes in Response to Quantitation Above a Threshold Value

As has been earlier indicated, where excessive levels of aldehydes in TPA or its esters as well as in FDCA or its esters are found in a composition being monitored or analyzed through the formation and quantitation of imines therefrom by UV-Vis spectroscopy, the responsive initiation and use of mitigation measures, such as hydrogenation or other derivatization of aldehydes in the composition to prevent color body formation by aldol condensation and/or the use of stabilizing additives to the composition, are contemplated by the present invention-though a particular objective of the present invention in certain embodiments is to provide a sufficiently real-time determination of the total aldehydes in a composition (such as a composition comprising FDCA, an ester of FDCA, TPA, an ester of TPA, both of FDCA and TPA or esters of both FDCA and TPA) to enable a reduction in the cumulative lower aldehydes as that composition is being produced through the alteration of the process generating the composition, and thereby reducing the frequency and/or duration (and associated added expense) of these mitigation measures. In an embodiment, the alteration of the process involves altering the manner in which the oxidation providing the FDCA, TPA or combination of FDCA and TPA is conducted. In another embodiment, a subject composition is subjected to a further, or to additional, oxidation to oxidize an additional portion of the aldehydes. Such additional oxidation may be achieved in a secondary oxidation zone.

Where the aldehydes determined by means of the present invention are such, whether in amount and/or character (for example, having a greater proportion of condensed aldehydes approaching a size as to evidence color in a composition, an oligomer or polymer prepared from the composition), as to make mitigation measures desirable for preventing the development of unwanted color in a monomer, a mixed monomer composition or the polymers made from the monomers or combinations of those monomers with which the present invention is concerned, one mitigation measure that could be taken would involve a low temperature hydrogenation of a composition in need of mitigation.

We have found that by means of such a low temperature hydrogenation using certain catalysts as described herein, the problematic aldehyde derivatives with which the present invention is concerned can, even when present in small concentrations, be selectively hydrogenated such that the desired monomers (e.g., FDCA, esters of FDCA, TPA and esters of TPA) within the composition nevertheless remain largely to almost entirely unreacted. This was surprising in view at least of the monomers having unsaturated furan rings (FDCA and esters thereof), as these unsaturated furan rings were expected to be susceptible to hydrogenation and thereby the formation of undesired byproducts (e.g., tetrahydrofuran derivatives) that could no longer be economically utilized in the production of bio-based polymers. Without being bound by theory, advantageous results are obtained using hydrogenation conditions and catalysts described herein, due to their effective conversion of not only minor amounts of aldehyde derivatives, but also minor amounts of degradation products that may likewise have aldehyde groups and/or may have conjugated double bonds. These aldehyde derivatives and their degradation products may contribute to initial color and reduced color stability.

The selective hydrogenation results in these aldehyde groups being converted to hydroxyalkyl groups. For example, in the case of any aldehyde derivative of FDCA or esterified derivative thereof as described above, a formyl group bonded directly to the furan ring may be converted to a hydroxymethyl group bonded directly to the furan ring, a formylmethyl group may be converted to a hydroxyethyl group, or a formylethyl group may be converted to a hydroxypropyl group. In the case of a contaminant that is an aldehyde derivative of FDCA or of an esterified derivative of FDCA, in which the aldehyde group is a formyl group, such contaminant may be selectively hydrogenated to its hydroxymethyl derivative. For example, in the case of FFCA (an aldehyde derivative of FDCA), this contaminant may be selectively hydrogenated to its hydroxymethyl derivative, 5-hydroxymethyl-2-furancarboxylic acid (HMFCA). In the case of FFME (an aldehyde derivative of FDME, which is an esterified derivative of FDCA), this contaminant may be selectively hydrogenated to its hydroxymethyl derivative, 5-hydroxymethyl-2-furancarboxylic acid methyl ester (HMFME).

A representative hydrogenation method comprises contacting a monomer composition in need of mitigation with hydrogen in the presence of a catalyst and under sufficiently mild hydrogenation conditions (particularly at a sufficiently low temperature) such that those contaminants associated with the formation of color or with color instability are selectively hydrogenated, and in the case of compositions including FDCA or esters of FDCA, without concurrently reducing the unsaturated furan ring in FDCA or the esterified derivative of FDCA to any substantial degree, for example, retaining at least 99.5 percent of the FDCA or the esterified derivative of FDCA originally found in the composition, and in other embodiments, at least 99.6, 99.7, 99.8 and 99.9 percent of the FDCA or of the esterified derivative of FDCA, intact in the hydrogenated composition.

The hydrogenation catalyst will typically be in solid form and in certain embodiments will comprise at least a first noble metal, and in other embodiments may preferably comprise both the first noble metal and a second noble metal, in all embodiments, however, being of a type such that under mild hydrogenation conditions (typically meaning at temperatures of 120 degrees Celsius or less) the catalyst is sufficiently active to hydrogenate the aldehyde derivatives found in an untreated composition but not so active as to concurrently reduce the unsaturated furan ring in those compositions comprising FDCA or an esterified derivative of FDCA to any substantial degree.

Noble metals in this regard are understood as referring to a class of metallic elements that are resistant to oxidation. In representative embodiments, the first noble metal, and preferably both the first and the second noble metal, may be selected from the group consisting of platinum (Pt), rhodium (Rh), ruthenium (Ru), palladium (Pd), silver (Ag), osmium (Os), iridium (Ir), and gold (Au), with the term “consisting of” being used merely to denote group members, according to a specific embodiment, from which the noble metal(s) are selected, but not to preclude the addition of other noble metals and/or other metals generally. Accordingly, a hydrogenation catalyst comprising a noble metal embraces a catalyst comprising at least two noble metals, as well as a catalyst comprising at least three noble metals, and likewise a catalyst comprising two noble metals and a third, non-noble metal such as a promoter metal (e.g., a transition metal). Representative promoter metals may be selected from the Groups 12-14 of the Periodic Table, such as from Group 13 or Group 14 of the Periodic Table. Preferred promoter metals are selected from the group consisting of zinc (Zn), gallium (Ga), germanium (Ge), indium (In), and tin (Sn), with Sn being particularly preferred. One or more promoter metals may be present in an amount, or a combined amount, generally from about 0.3 wt-% to about 10 wt-%, and typically from about 0.5 wt-% to about 3 wt-%, based on the weight of the catalyst.

According to preferred embodiments, one or more noble metal(s) and/or one or more promoter metals is/are present in an amount, or a combined amount, generally from about 0.1 wt-% to about 10 wt-%, and typically from about 0.5 wt-% to about 5 wt-%, based on the weight of the catalyst. Regardless of the amount, the hydrogenation catalyst may be a solid supported noble metal-containing catalyst, meaning that the noble metal(s) and optional promoter metal(s) is/are disposed on a solid support, which may be substantially refractory (inert) under the hydrogenation conditions, or which may itself be functional (e.g., in the case of providing acidic or basic sites to provide or promote catalytic activity). Carbon, including activated carbon, is an exemplary solid support. In the case of at least two, or only two, noble metals being present, they may each independently be present in amounts from about 0.05 wt-% to about 5 wt-%, or from about 0.3 wt-% to about 3 wt-%, based on the weight of the catalyst. For example, a representative hydrogenation catalyst may comprise the two noble metals Pt and Ru, which may independently be present in an amount within these ranges (e.g., from about 0.05 wt-% to about 5 wt-%). That is, either the Pt may be present in such an amount, the Ru may be present in such an amount, or both Pt and Ru may be present in such amounts. The hydrogenation catalyst may comprise either or both of these noble metals, or other noble metals, in such amounts, or in a combined amount, as described above.

A particularly preferred hydrogenation catalyst will comprise the noble metals Pt and Ru, together with the promoter metal Sn, with these metals present in amounts as described above. A hydrogenation catalyst, according to a particular embodiment, comprises from about 0.1 wt-% to about 1 wt-% (more preferably from about 0.3 wt-% to about 1 wt-%) Pt, from about 0.5 wt-% to about 5 wt-% (more preferably from about 1 wt-% to about 3 wt-%) Ru, and from about 0.5 wt-% to about 5 wt-% (more preferably from about 1 wt-% to about 3 wt-%) Sn.

In representative embodiments, a single noble metal (e.g., either Pt or Ru), or otherwise two noble metals (e.g., both Pt and Ru) may be substantially the only noble metals present in the hydrogenation catalyst, such that, for example, any other noble metal(s) is/are present in an amount or a combined amount of less than about 0.1 wt-%, or less than about 0.05 wt-%, based on the weight of the hydrogenation catalyst. In further representative embodiments, a single noble metal (e.g., Pt), or two noble metals (e.g., both Pt and Ru), and optionally a single promoter metal (e.g., Sn) are substantially the only metals present in the hydrogenation catalyst, with the exception of metals that may be present in the solid support (e.g., such as aluminum being present in the solid support as aluminum oxide). Therefore, in the case of support comprising substantially all carbon, the single noble metal, or two noble metals, and optional promoter metal(s), may be substantially the only metals present. For example, any other metal(s), besides the single noble metal, or two noble metals, optional promoter metal, and metals of the solid support (if any), may be present in an amount or a combined amount of less than about 0.1 wt-%, or less than about 0.05 wt-%, based on the weight of the hydrogenation catalyst. Any metals present in the catalyst, including noble metal(s) and optional promoter metal(s), may have a metal particle size in the range generally from about 0.3 nanometers (nm) to about 20 nm, typically from about 0.5 nm to about 10 nm, and often from about 1 nm to about 5 nm.

The noble metal(s) and optional promoter metal(s) of representative hydrogenation catalysts may be disposed or deposited on a solid support, which is intended to encompass catalysts in which the noble metal(s) and optional promoter metal(s) is/are on the support surface and/or within a porous internal structure of the support. Therefore, in addition to such noble metal(s) and optional promoter metal(s), representative hydrogenation catalysts may further comprise a solid support, with exemplary solid supports comprising carbon and/or one or more metal oxides. Exemplary metal oxides are selected from the group consisting of aluminum oxide, silicon oxide, titanium oxide, zirconium oxide, magnesium oxide, strontium oxide, tin oxide, etc. The solid support may comprise all, or substantially all of the one or more of such metal oxides, for example such that the one or more metal oxides are present in an amount, or combined amount, of at least about 95% by weight of the solid support. Alternatively, carbon, such as activated carbon, may be present in an amount of at least about 95% by weight, or at least about 99% by weight, of the solid support. Activated carbon refers to forms of carbon following any of a number of possible treatments (e.g., high temperature steaming) to increase porosity. Activated carbon also refers to forms obtained by chemical treatment (e.g., an acid or a base) to alter properties such as the concentration of acid sites.

The noble metal(s) and optional promoter metal(s) may be incorporated in the solid support according to known techniques for catalyst preparation, including sublimation, impregnation, or dry mixing. In the case of impregnation, an impregnation solution of soluble compound(s) of one or more of the noble metals and optionally one or more of the promoter metals in a polar (aqueous) or non-polar (e.g., organic) solvent may be contacted with the solid support, preferably under an inert atmosphere. For example, this contacting may be carried out, preferably with stirring, in a surrounding atmosphere of nitrogen, argon, and/or helium, or otherwise in a non-inert atmosphere, such as air. The solvent may then be evaporated from the solid support, for example using heating, flowing gas, and/or vacuum conditions, leaving the dried, noble metal-impregnated and optionally promoter-impregnated support. The noble metal(s) and optionally the promoter metal(s) may be impregnated in the solid support, such as in the case of two noble metals and a promoter metal being impregnated simultaneously with these being dissolved in the same impregnation solution, or otherwise being impregnated separately using different impregnation solutions and contacting steps. In any event, the noble metal-impregnated and optionally promoter-impregnated support may be subjected to further preparation steps, such as washing with the solvent to remove excess noble metal(s), optional promoter metal(s), and impurities, further drying, calcination, etc. to provide the hydrogenation catalyst.

The solid support itself may be prepared according to known methods, such as extrusion to form cylindrical particles (extrudates) or oil dropping or spray drying to form spherical particles. Regardless of the specific shape of the solid support and resulting catalyst particles, the amounts of noble metal(s) and optional promoter metal(s) being present in the hydrogenation catalyst, as described above, refer to the weight of such noble metal(s) and optional promoter metal(s), on average, in a given catalyst particle (e.g., of any shape such as cylindrical or spherical), independent of the particular distribution of the noble metal(s) and optional promoter metal(s) within the particle. In this regard, it can be appreciated that different preparation methods can provide different distributions, such as deposition of the noble metal(s) and optional promoter metal(s) primarily on or near the surface of the solid support or uniform distribution of the noble metal(s) and optional promoter metal(s) throughout the solid support. In general, weight percentages described herein, being based on the weight of the solid support or otherwise based on the weight of hydrogenation catalyst, can refer to weight percentages in a single catalyst particle but more typically refer to average weight percentages over a large number of catalyst particles, such as the number in a hydrogenation reactor that form a catalyst bed as used in stabilization methods described herein.

Typical hydrogenation conditions include an elevated hydrogen partial pressure, such as at least about 2 megapascals (MPa) (291 psi), for example from about 2 MPa (291 psi) to about 18 MPa (2611 psi), and more typically from about 2.5 MPa (363 psi) to about 10 MPa (1450 psi). The pressure in the hydrogenation reactor may be generated predominantly or substantially from hydrogen, such that these ranges of hydrogen partial pressure may correspond substantially to the total pressure. However, the presence of other gaseous species vaporized from the reaction mixture (e.g., vaporized solvent), may result in the hydrogen partial pressure being reduced relative to these total pressures, such that, for example, the total hydrogenation reactor pressure may range for example from about 2.5 MPa (363 psi) to about 20 MPa (2900 psi), and more typically from about 3 MPa (435 psi) to about 12 MPa (1740 psi).

Reaction temperatures of typically less than 120 degrees Celsius will be preferred for carrying out the hydrogenation, and as demonstrated in the working examples below, temperatures on the order of 50 or 60 degrees Celsius were found adequate with the exemplified hydrogenation catalyst and with enough hydrogen being supplied to reduce substantially all of the aldehyde derivatives in the FDCA- and FDCA ester-containing compositions tested, while concurrently leaving the furan ring intact.

The reaction time, i.e., time at which the reaction mixture is maintained under conditions of pressure and temperature at any target values or target sub-ranges within any of the ranges of pressure and temperature given above (e.g., a target, total pressure value of 4.1 MPa (600 psi) and a target temperature of 80° C. (176° F.), is from about 0.1 hours to about 24 hours, and preferably from about 0.5 hours to about 5 hours, in the case of a batchwise reaction. For a continuous process, these reaction times correspond to reactor residence times. An additional parameter that is relevant for a continuous process is weight hourly space velocity (WHSV), which is understood in the art as the weight flow of the feed (e.g. monomer composition) to a reactor per hour, divided by the weight of the hydrogenation catalyst. This parameter therefore represents the equivalent catalyst bed weight of the feed processed every hour, and it is related to the inverse of the reactor residence time. According to representative embodiments, the hydrogenation conditions include a WHSV generally from about 0.01 $hr^{-1}$ to about 20 $hr^{-1}$, and typically from about 0.05 $hr^{-1}$ to about 5 $hr^{-1}$.

Such mild hydrogenation conditions, in combination with a judiciously selected, less active hydrogenation catalyst, produce the selective hydrogenation of the problematic aldehyde derivatives to their corresponding hydroxyalkyl derivatives. The composition comprising these aldehyde derivatives, upon introduction to the hydrogenation reactor that is used for the contacting of this feed and hydrogen in the presence of the hydrogenation catalyst, may be dissolved in a suitable solvent (e.g., an organic solvent comprising, or consisting of, methanol or other alcohol). The untreated composition, optionally together with solvent, as well as hydrogen, may be added batchwise or continuously to the hydrogenation reactor. For example, in the case of continuous operation, the hydrogen may be present in a recycle gas stream and added in a molar excess with respect to the aldehyde derivatives present in the monomer composition. In either a continuous or batchwise operation, the reaction mixture comprising the composition and solvent may be maintained under hydrogenation conditions as described herein, to produce an aldehydes-mitigated composition for further processing or use.

A continuous hydrogenation process may therefore be performed by continuous feeding of a composition in need of mitigation (e.g., in the form of a solubilized composition that is dissolved in a solvent), and hydrogen to the hydrogenation reactor containing the catalyst (e.g., as a fixed bed) and continuous withdrawal, from the reactor, of the resultant hydrogenated/aldehydes-mitigated composition, optionally following its separation from excess (unreacted) hydrogen.

According to some embodiments, the compositions in question may be subjected to one or more purification steps prior to hydrogenation, in order to reduce the amount of aldehydes present and thereby lessen the requirements (e.g., hydrogen consumption, hydrogen partial pressure, and/or temperature) for achieving below a given color-related threshold level of the aldehydes in a given composition. For example, representative methods may further comprise, prior to (e.g., upstream of) the contacting with hydrogen, crystallizing a crude composition comprising FDCA or one or more esterified derivatives of FDCA, to increase its purity (relative to the crude composition) in the FDCA or one or more esterified derivatives of FDCA prior to the hydrogenation step being undertaken on the composition.

Consequently and parenthetically, "subjecting the composition to hydrogenation" as a particular means of mitigating aldehydes present in a composition will thus not be taken as implying other means of mitigating the aldehydes by removing a portion of the same from the composition or in any other way cannot also be used; on the contrary, combinations of mitigation measures may be used, including, but not being limited to, the exemplary methods described herein.

Crystallization can include solubilizing the crude composition in a suitable solvent (e.g., an organic solvent comprising methanol or other alcohol) and then cooling the crude composition/solvent system to crystallize the composition. In particular embodiments, the purity of the desired product in the crude composition from a preceding oxidation step will typically be about 85 wt-% or less (e.g., from about 70 wt-% to about 85 wt-%). As a result of the crystallization, the purity of the composition being subjected to hydrogenation may be increased to 99 wt-% or more. For example, in some embodiments, crystallization of the crude composition may achieve a purity specification of at least about 99.5 wt-%, with in all cases a reduced content of the aldehyde derivatives.

In some embodiments, in fact, crystallization alone may be found sufficient as a mitigation means without more, though generally it is expected that some further mitigation, for example, by means of a hydrogenation of the composition of the type described above will be desirable. For example, a crystallization step may reduce the chromaticity coordinate b* from a value of greater than 5, or greater than 10, to a value of less than 5. In general, crystallizing a crude composition comprising FDCA or an esterified derivative thereof may result in a monomer-containing composition having chromaticity coordinate b* of less than 5, less than 3, or even less than 1. All or predominantly all of the color improvement associated with crystallization may be due to the reduction in the amount of aldehydes present in the monomer-containing composition. For example, crystallization of a crude FDCA composition or a crude FDME composition can reduce the amount of associated FFCA or FFME from the values described above (e.g., from about 0.3 wt-% to about 10 wt-%, FFCA in the case of an FDCA composition or from about 0.1 wt-% to about 3 wt-% FFME in the case of an FDME composition), or optionally from other starting amounts for a given crude composition comprising FDCA or an esterified derivative thereof, to less than 1 wt-%, less than 0.5 wt-%, or even less than 0.2 wt-%, of the corresponding aldehyde derivative.

Accordingly, while it will be understood from the above that the removal of at least a portion of the aldehydes, in an initial purification of a crude composition comprising FDCA or an esterified derivative thereof (e.g., by crystallization), can itself substantially beneficially improve the color and/or color stability of the resulting monomer-containing composition and can provide high purity materials with substantial reductions in the concentrations of aldehydes (precursors of color) present, it will be recalled that even very small amounts of residual aldehydes and/or other color bodies can cause the resulting composition to fail a given color specification, such as a chromaticity coordinate b* of less than 0.5, so that some further mitigation—for example, by hydrogenation as described herein-will ordinarily also be employed.

As described above, the hydrogenation method contemplated herein is selective so that aldehyde groups present in a composition are effectively neutralized as a source of eventual color development by molecular weight buildup through aldol condensation. In representative embodiments, whether as a result of the conversion of aldehyde groups to something else (by selective hydrogenation or some other manner of derivatization), the use of crystallization or some other means to remove aldehyde functionality from the composition or by a combination of removing and converting the aldehyde functionality in a composition, the total amount of aldehydes in combination in a composition will in any event be reduced to less than about 500 wt-ppm, less than about 200 wt-ppm, or even less than about 100 wt-ppm.

Another mitigation measure that is contemplated when an excessive level of aldehydes is indicated as present in a composition by the quantitative analysis method of the present invention would involve adding one or more color stabilizing additive compounds to the composition, a measure described in commonly-assigned WO 2019/246034, "Color Stabilization of Monomers and Other Reactants for Forming Bio-Based Polymers" (the "WO'034" application), which prior application is hereby incorporated by reference herein. As demonstrated in WO'034 and in the examples below reproduced from WO'034, these color stabilizing additive compounds have been demonstrated as useful for mitigating against color development in FDCA- and FDCA ester-containing compositions such as produced by a Mid-Century type oxidation of one or more furanic precursors from the dehydration of hexose sugars (such as fructose).

Representative color stabilizing additive compounds taught in WO'034 include substituted phenols, which refer to compounds having at least one phenol moiety, but possibly two or more phenol moieties, in which the benzene ring(s) of such moiety or moieties have at least one substituent, other than the hydroxyl substituent. Particular examples of such substituents are alkoxy and alkyl substituents, with methoxy and tert-butyl substituents being preferred. Therefore, examples of substituted phenols include alkoxy-substituted (e.g., methoxy-substituted) and alkyl-substituted (e.g., tert-butyl-substituted) phenols, which are namely compounds having at least one phenol moiety, but possibly two or more phenol moieties, with one or more alkoxy (e.g., methoxy) and alkyl (e.g., tert-butyl) substituents, respectively. In the case of tert-butyl-substituted phenols, these compounds are often referred to as "hindered phenols," in view of the steric hindrance resulting from the geometry of these substituents.

Substituted phenols include butylated hydroxyanisole (BHA); 2,6-dimethoxyphenol (DMP); 2,6-di-tert-butyl-4-methoxylphenol (DTMP); pentaerythritol tetrakis[3-[3,5-di-tert-butyl-4-hydroxyphenyl]propionate (PETC); 2-tert-butylhydroquinone (TBHQ); ethylenebis (oxyethylene) bis-(3-(5-tert-butyl-4-hydroxy-m-tolyl)-propionate); and octadecyl-3-(3,5-di-tert-butyl-4-hydroxyphenyl)-propionate. Of these compounds, (i) BHA, DMP, and DTMP are methoxy-substituted phenols, and (ii) DTMP, PETC, TBHQ, ethylenebis (oxyethylene) bis-(3-(5-tert-butyl-4-hydroxy-m-tolyl)-propionate); and octadecyl-3-(3,5-di-tert-butyl-4-hydroxyphenyl)-propionate are tert-butyl-substituted phenols.

Other color stabilizing additive compounds include phenyl-substituted amines (e.g., 4,4'-bis(α,α-dimethylbenzyl)diphenylamine (XDPA)), phosphites (e.g., tris(2,4-di-tert-butylphenyl)phosphite), and antioxidant vitamins (e.g., ascorbic acid). The compound PETC is commercially available as Irganox®1010 (BASF) or Dovernox®10 (Dover Chemical Corp.); the compound ethylenebis (oxyethylene) bis-(3-(5-tert-butyl-4-hydroxy-m-tolyl)-propionate) is commercially available as Irganox®245 (BASF); the compound tris(2,4-di-tert-butylphenyl)phosphite is commercially available as Irgafos®168 (BASF); and the compound octadecyl-3-(3,5-di-tert-butyl-4-hydroxyphenyl)-propionate is commercially available as Irganox®1076 (BASF) or Dovernox®76 (Dover Chemical Corp.).

Certain combinations of the compounds and/or classes of compounds as described above are commercially available and could be conveniently used, if desired. For example, the combination of 50 wt-% PETC and 50 wt-% tris(2,4-di-tert-butylphenyl)phosphite is commercially available as Irganox®B255 (BASF). The combination of 20 wt-% octadecyl-3-(3,5-di-tert-butyl-4-hydroxyphenyl)-propionate and 80 wt-% tris(2,4-di-tert-butylphenyl)phosphite is commercially available as Irganox®B900 (BASF). The combination of 50 wt-% PETC and 50 wt-% tris(2,4-di-tert-butylphenyl) phosphite is commercially available as Irganox®B225 (BASF).

Color stabilizing additive compounds may be used in a composition in need of mitigation in an amount, or combined amount in the case of a combination, generally from 10 parts per million by weight (wt-ppm) to 1 percent by weight (wt-%), typically from 50 wt-ppm to 2000 wt-ppm, and often from 50 wt-ppm to 1500 wt-ppm. According to preferred embodiments, the additive BHA may be present in a composition in an amount from 100 wt-ppm to 500 wt-ppm, or the additive Irganox®245 may be present in a composition in an amount from 800 wt-ppm to 1200 wt-ppm.

In other preferred embodiments, the additive BHA may be present in a composition in an amount from 50 wt-ppm to 800 wt-ppm or, more preferably, from 50 wt-ppm to 500 wt-ppm. In other preferred embodiments, the additive DMP may be present in a composition in an amount from 200 wt-ppm to 1500 wt-ppm or, more preferably, from 400 wt-ppm to 600 wt-ppm. In other preferred embodiments, the additive DTMP may be present in a composition in an amount from 50 wt-ppm to 100 wt-ppm. In other preferred embodiments, the additive XDPA may be present in a composition in an amount from 100 wt-ppm to 1500 wt-ppm. In other preferred embodiments, the additive PETC may be present in a composition in an amount from 200 wt-ppm to 1500 wt-ppm. In other preferred embodiments, the additive Irganox®245 may be present in a composition in an amount from 50 wt-ppm to 1500 wt-ppm or, more preferably, from 50 wt-ppm to 100 wt-ppm. In other preferred embodiments, the additive Irganox®B900 may be present in a composition in an amount from 50 wt-ppm to 1500 wt-ppm or, more preferably, from 50 wt-ppm to 500 wt-ppm. In other preferred embodiments, the additive Irganox®B225 may be present in a composition in an amount from 50 wt-ppm to 1500 wt-ppm or, more preferably, from 50 wt-ppm to 500 wt-ppm.

The following examples are illustrative and supportive of the various aspects of the present invention as just described:

EXAMPLES

Examples 1-4

For these examples, a number of aldehyde derivative solutions were prepared in methylene chloride, using a predetermined quantity of a known aldehyde derivative impurity associated with FDME manufacture (FFME), with TPA manufacture (4-formylbenzoic acid (or 4-carboxybenzaldehyde (4-CBA)) and terephthaldehyde) and with DMT manufacture (methyl-4-formylbenzoate) and using various dilution volumes of further methylene chloride. Corresponding quantities of DPPD sulfate were then added to each of these solutions, in the form of solutions of DPPD sulfate in a solvent comprised of 0.3 weight percent of acetic acid in methanol. After thirty minutes' agitation to allow the formation of the desired imine adducts, each of the solutions was then analyzed by UV-Vis spectroscopy to verify that instrumental method's capability for showing a proportionate absorbance for the amount of the relevant aldehyde derivative impurity present in a given solution, generally across a range of wavelengths ranging from 410 nm to 460 nm. The analyses indicated that UV-Vis spectroscopy would be effective for accurately quantitating FFME at levels at least as low as 900 parts per billion by weight, 4-CBA at levels at least as low as 495 parts per billion by weight, terephthaldehyde at levels at least as low as 443 parts per billion by weight and methyl-4-formylbenzoate at levels at least as low as 540 parts per billion by weight.

Example 5

For an initial example demonstrating hydrogenation as an effective mitigation measure upon the determination of an excessive amount of aldehydes, particularly, in a composition comprising FDCA or an ester of FDCA (given the hydrogenation/reduction has previously been known for addressing 4-CBA in TPA), a mixture of 3 grams FDME and 0.5 grams of FFME, dissolved in 20 ml methanol, was added to a 75 ml high pressure, reactor (Parr Instrument Company). To this solution was added 0.5 grams of particles of solid hydrogenation catalyst containing 2 wt-% Ru/2 wt-% Sn/0.5 wt-% Pt, supported on carbon. The reactor was pressurized and purged with hydrogen (three times at 500 psi pressure) while continuously stirring the reaction mixture at 800 rpm. The vessel was thereafter pressurized with hydrogen to 600 psi, and the reaction contents were heated to 50° C. and maintained at this temperature for 1 hour. The reaction mixture was then cooled to room temperature and filtered by vacuum filtration to remove the catalyst. The filtrate was then subjected to rotary evaporation to remove the solvent and obtain a white solid. This solid was analyzed by nuclear magnetic resonance (NMR) to resolve the components of the product mixture. This mixture was found to contain 84.9 wt-% FDME, or almost the same content as in the starting mixture of FDME and FFME, in addition to only 3.1 wt-% FFME. The hydroxymethyl derivative and hydrogenation product, HMFME was also present. Results therefore showed that a significant proportion of FFME was converted, or partially reduced, to HMFME, without converting FDME.

Example 6

The experiment of Example 5 was repeated, except with a reaction temperature of 60° C. instead of 50° C. In this case, the product mixture contained 84.9 wt-% FDME, or almost the same content as in the starting mixture of FDME and FFME, in addition to only 4.2 wt-% FFME. The hydroxymethyl derivative and hydrogenation product, HMFME was also present, as well as a trace amount (less than 1000 wt-ppm) of hydrogenation products having a tetrahydrofuran (saturated) ring. Again, these results showed that, even at this higher temperature compared to that used in Example 5 above, a significant proportion of FFME was converted, or partially reduced, to HMFME, without converting FDME.

Example 7

The experiment of Example 5 was repeated, except with a reaction pressure of 1200 psi, instead of 600 psi. In this case, the product mixture contained 84.8 wt-% FDME, or almost the same content as in the starting mixture of FDME and FFME, in addition to only 0.3 wt-% FFME. The hydroxymethyl derivative and hydrogenation product, HMFME was also present, as well as a trace amount (less than 1000 wt-ppm) of hydrogenation products having a tetrahydrofuran (saturated) ring. By increasing the reaction severity, in this case by increasing hydrogen pressure, it was therefore observed that the FFME was almost entirely converted, and still without any significant losses of FDME by ring saturation.

Comparative Example 1

The experiment of Example 5 was repeated, except with a reaction temperature of 80° C., instead of 50° C., and a pressure of 500 psi, instead of 600 psi. Also, the catalyst contained 2 wt-% Ru/1 wt-% sulfur(S), supported on carbon. Using this catalyst composition, essentially all of the furan rings of the starting mixture were hydrogenated to the corresponding tetrahydrofuran rings, causing a loss of the desired FDME.

Comparative Example 2

The experiment of Comparative Example 1 was repeated, except the catalyst contained 2% wt-% Ru, supported on carbon. Using this catalyst composition, essentially all of the furan rings of the starting mixture were hydrogenated to the corresponding tetrahydrofuran rings, causing a loss of the desired FDME.

Example 8

The partial hydrogenation of 5-hydroxymethyl furfural (HMF) was investigated for producing 2,5-dihydroxymethylfuran. A 10 gram sample of HMF, dissolved in 90 grams of methanol, was added to a 300 ml high pressure Parr reactor (Parr Instrument Company). To this solution was added 1.5 grams of particles of solid hydrogenation catalyst containing 5 wt-% Ru, supported on carbon. The reactor was pressurized and purged with hydrogen (three times at 500 psi pressure) while continuously stirring the reaction mixture at 600 rpm. The vessel was thereafter pressurized with hydrogen to 1000 psi, and the reaction contents were heated to 100° C. and maintained at this temperature for 1 hour. The reaction mixture was then cooled to room temperature and filtered by vacuum filtration to remove the catalyst. The filtrate was then subjected to rotary evaporation to remove the solvent and obtain a light brown oil. This oil was analyzed by nuclear magnetic resonance (NMR) to resolve the components of the product mixture, which contained 2,5-dihydroxymethylfuran.

Example 9

The partial hydrogenation of 5-acetylmethyl furfural (AcMF) was investigated for producing 2-hydroxymethyl, 5-acetylmethyl furan. A 20 gram sample of AcMF, dissolved in 80 grams of methanol, was added to a 300 ml high pressure Parr reactor (Parr Instrument Company). To this solution was added 3 grams of particles of solid hydrogenation catalyst containing 5 wt-% Ru, supported on carbon. The reactor was pressurized and purged with hydrogen (three times at 500 psi pressure) while continuously stirring the reaction mixture at 600 rpm. The vessel was thereafter pressurized with hydrogen to 1000 psi, and the reaction contents were heated to 100° C. and maintained at this temperature for 1 hour. The reaction mixture was then cooled to room temperature and filtered by vacuum filtration to remove the catalyst. The filtrate was then subjected to rotary evaporation to remove the solvent and obtain a light brown oil. This oil was analyzed by nuclear magnetic resonance (NMR) to resolve the components of the product mixture, which contained >95 wt-% 2-hydroxymethyl, 5-acetylmethyl furan.

Example 10

The color and color stability of samples containing FDME, with 100 wt-ppm to 10,000 wt-ppm of FFCA, were investigated. To prepare the samples, 20 grams of FDME in each case, with the specified proportions of FFCA, were charged to 25 ml headspace vials, each equipped with a magnetic stir bar. The vials were then placed in a heating block that was pre-heated to a specified temperature. Complete sample melting was observed between 5-10 minutes, and the stir rate was set to 500 rpm. After allotted times, the samples were removed, cooled to room temperature, and then analyzed for color, and specifically the L* a* b* chromaticity coordinates and APHA color index. The samples used for the color analysis contained 6 wt-% of the FDME/FFCA in a solvent mixture of 1:1 acetonitrile/isopropanol. Each measurement was carried out in triplicate and averaged. The contaminant concentrations, in addition to the conditions of temperature, time, and atmosphere for the stability testing, are shown in Table 1 below, together with the results for each sample and a commercial reference sample (Sarchem). Given a presumed color specification of L*>99, a*<0.5, b*<0.5, and APHA<10, the indication as to whether the sample passed or failed the specifications is also included in this table.

TABLE 1

FFCA in FDME, Color Stability Testing

| Run | Data Name | L*(C) | a*(C) | b*(C) | APHA | Specs |
|---|---|---|---|---|---|---|
| | IPA-Acetonitrile Matrix | 99.98 | 0.00 | 0.00 | 0 | — |
| | FDME (Sarchem) | 99.82 | −0.01 | 0.02 | 0 | — |
| 1 | 100 ppm FFCA in FDME, 120° C., 2 h, $N_2$ | 99.82 | 0.00 | 0.05 | 1 | Pass |
| 2 | 100 ppm FFCA in FDME, 120° C., 2 h, Air | 99.45 | −0.08 | 0.16 | 3 | Pass |

TABLE 1-continued

| FFCA in FDME, Color Stability Testing | | | | | | |
|---|---|---|---|---|---|---|
| Run | Data Name | L*(C) | a*(C) | b*(C) | APHA | Specs |
| 3 | 100 ppm FFCA in FDME, 200° C., 2 h, $N_2$ | 99.72 | −0.13 | 0.54 | 19 | Fail |
| 4 | 100 ppm FFCA in FDME, 200° C., 2 h, Air | 99.45 | −0.17 | 1.10 | 38 | Fail |
| 5 | 1000 ppm FFCA in FDME, 120° C., 2 h, $N_2$ | 99.77 | 0.01 | 0.11 | 4 | Pass |
| 6 | 1000 ppm FFCA in FDME, 120° C., 2 h, Air | 99.61 | −0.11 | 0.21 | 6 | Pass |
| 7 | 1000 ppm FFCA in FDME, 200° C., 2 h, $N_2$ | 99.72 | −0.26 | 0.84 | 26 | Fail |
| 8 | 1000 ppm FFCA in FDME, 200° C., 2 h, Air | 99.45 | −0.27 | 1.43 | 46 | Fail |
| 9 | 10000 ppm FFCA in FDME, 200° C., 2 h, $N_2$ | 98.77 | −1.10 | 3.90 | 127 | Fail |
| 10 | 10000 ppm FFCA in FDME, 200° C., 2 h, Air | 98.81 | −0.92 | 3.70 | 122 | Fail |

This example underscores that FFCA leads to color formation, particularly at elevated temperatures, akin to those encountered during esterification. The most easily violated specification was the chromaticity coordinate b*, which is <0.5. Importantly, even the relatively low level of 100 ppm of FFCA can result in failure to meet this specification.

Example 11

The color and color stability of samples containing FDME were investigated, according to the protocol used in Example 10, except that in these samples 100 wt-ppm to 10,000 wt-ppm of FFME was used as the color former/contaminant. The contaminant concentrations, in addition to the conditions of temperature, time, and atmosphere for the stability testing, are shown in Table 2 below, together with the results for each sample and a commercial reference sample (Sarchem). With the same presumptive color specification of L*>99, a*<0.5, b*<0.5, and APHA<10, the indication as to whether the sample passed or failed the specifications is also included in this table.

TABLE 2

| FFME in FDME, Color Stability Testing | | | | | | |
|---|---|---|---|---|---|---|
| Run | Data Name | L*(C) | a*(C) | b*(C) | APHA | Specs |
| — | IPA-Acetonitrile Matrix | 99.98 | 0.00 | 0.00 | 0 | — |
| — | FDME (Sarchem) | 99.82 | −0.01 | 0.02 | 0 | — |
| 1 | 100 ppm FFME in FDME, 120° C., 2 h, $N_2$ | 99.71 | 0.00 | 0.11 | 2 | Pass |
| 2 | 100 ppm FFME in FDME, 120° C., 2 h, Air | 99.80 | −0.03 | 0.23 | 4 | Pass |
| 3 | 100 ppm FFME in FDME, 200° C., 2 h, $N_2$ | 99.63 | −0.16 | 0.63 | 18 | Fail |
| 4 | 100 ppm FFME in FDME, 200° C., 2 h, Air | 99.58 | −0.25 | 1.31 | 46 | Fail |
| 5 | 1000 ppm FFME in FDME, 120° C., 2 h, $N_2$ | 99.82 | 0.02 | 0.16 | 3 | Pass |
| 6 | 1000 ppm FFME in FDME, 120° C., 2 h, Air | 99.79 | −0.09 | 0.31 | 7 | Pass |
| 7 | 1000 ppm FFME in FDME, 200° C., 2 h, $N_2$ | 99.35 | −0.22 | 1.02 | 33 | Fail |
| 8 | 1000 ppm FFME in FDME, 200° C., 2 h, Air | 99.28 | −0.38 | 1.84 | 69 | Fail |
| 9 | 10000 ppm FFME in FDME, 200° C., 2 h, $N_2$ | 97.92 | −1.77 | 4.82 | 189 | Fail |
| 10 | 10000 ppm FFME in FDME, 200° C., 2 h, Air | 97.61 | −2.02 | 6.17 | 256 | Fail |

This example underscores that FFME leads to color formation, particularly at elevated temperatures, akin to those encountered during esterification. As in Example 10, the most easily violated specification was the chromaticity coordinate b*, which is <0.5. Importantly, even the relatively low level of 100 ppm of FFME can cause result in failure to meet this specification.

Example 12

Samples containing FDME and varying levels of FFME, as shown in Table 3 below, were prepared according to the protocol used in Example 10, and then analyzed for color, and specifically the L* a* b* chromaticity coordinates and APHA color index. The samples used for the color analysis contained 6 wt-% of the FDME/FFME in a solvent mixture of 1:1 acetonitrile/isopropanol. These samples were thereafter subjected to a hydrogenation step for stabilization. The color results, both pre- and post-hydrogenation are also shown.

TABLE 3

| FFME in FDME, Color Testing with Hydrogenation Colorimetry: Transmittance, 6 wt. % solids in 1:1 acetonitrile/isopropanol | | | | | |
|---|---|---|---|---|---|
| Sample | Data Name | L*(C) | a*(C) | b*(C) | Hazen/ APHA |
| 1 | 15% FFME in FDME | 99.11 | −2.57 | 7.65 | 236 |
| 2 | 3% FFME in FDME | 99.47 | −1.80 | 5.12 | 160 |
| 3 | 0.3% FFME in FDME | 99.33 | −1.68 | 2.25 | 97 |
| 4 | 15% FFME in FDME, Post Hydrogenation | 99.76 | −0.32 | 0.98 | 28 |

TABLE 3-continued

| FFME in FDME, Color Testing with Hydrogenation Colorimetry: Transmittance, 6 wt. % solids in 1:1 acetonitrile/isopropanol | | | | | |
|---|---|---|---|---|---|
| Sample | Data Name | L*(C) | a*(C) | b*(C) | Hazen/ APHA |
| 5 | 3% FFME in FDME, Post Hydrogenation | 99.87 | −0.12 | 0.38 | 14 |
| 6 | 0.3% FFME in FDME, Post Hydrogenation | 99.90 | −0.03 | 0.10 | 2 |

The results showed the strong correlation between the amount of FFME contaminant originally present in the FDME, and the resulting color of the sample. More significantly, however, hydrogenation had a profound impact in terms of improving color, and in fact this improvement was apparent even upon a visual comparison between the samples before and after hydrogenation.

Example 13

Samples containing FDCA and varying levels of FFCA, as shown in Table 4 below, were prepared according to the protocol used in Example 10, and then analyzed for color, and specifically the L* a* b* chromaticity coordinates and APHA color index. The samples used for the color analysis contained 1 wt-% of the FDCA/FFCA in a solvent mixture of TEGMME. These samples were thereafter subjected to a hydrogenation (reduction) step for stabilization. The color results, both pre- and post-hydrogenation (reduction) are also shown below in Table 4.

TABLE 4

FFCA in FDCA, Color Testing with Hydrogenation

| Sample | Data Name | L*(C) | a*(C) | b*(C) | Hazen/ APHA |
|---|---|---|---|---|---|
| 1 | 14% FFCA in FDCA | 98.28 | −2.58 | 10.11 | 334 |
| 2 | 3% FFCA in FDCA | 98.47 | −2.21 | 8.73 | 286 |
| 3 | 1% FFCA in FDCA | 99.33 | −1.39 | 4.52 | 145 |
| 4 | 0.3% FFCA in FDCA | 99.68 | −0.62 | 2.14 | 67 |
| 5 | 14% FFCA in FDCA, Post Reduction | 100.01 | −0.06 | 0.07 | 0 |
| 6 | 3% FFCA in FDCA, Post Reduction | 99.89 | −0.05 | 0.11 | 1 |
| 7 | 1% FFCA in FDCA, Post Reduction | 99.96 | −0.02 | 0.07 | 1 |
| 8 | 0.3% FFCA in FDCA, Post Reduction | 99.99 | −0.03 | 0.09 | 1 |

As in Example 12, these results also showed the strong correlation between the amount of contaminant, in this case FFCA, originally present in the FDCA, and the resulting color of the sample. Hydrogenation had a profound impact in terms of improving color, and this improvement was apparent even upon a visual comparison between the samples before and after hydrogenation. The FDCA in the samples was left essentially intact, with from 99.7 percent of the FDCA being left after hydrogenation in Samples 1 and 3, 99.8 percent of the FDCA being left intact in Sample 4 following hydrogenation, and 99.9 percent of the FDCA remaining, after hydrogenation in Sample 2.

Example 14

An FDME sample was crystallized from the mother liquor of an esterification reaction step and was determined to have 82.6 wt-% FDME (dimethyl ester), with 16.0 wt-% of the monomethyl ester, FDMME, resulting from incomplete esterification. The sample also contained 0.36 wt-% of the FDCA starting compound and 0.58 wt-% of the aldehyde derivative contaminant FFME. The solid material was dissolved in a solvent mixture and analyzed for color according to the procedure in Example 6. The chromaticity coordinates L*, a* and b* were 69.38, 7.02, and 59.12, showing significant discoloration, particularly with respect to b*. The sample as analyzed was then subjected to a hydrogenation step for stabilization. Analysis of the sample, post-hydrogenation, indicated that it had, on a solvent-free basis, 82.9 wt-% FDME, 16.1 wt-% FDMME, and 0.45 wt-% FDCA, and therefore the hydrogenation had little impact in terms of converting these desired monomers. However, this sample had no detectable FFME, further showing that the hydrogenation was highly selective for the aldehyde derivative. Consistent with this analytical result, the chromaticity coordinates L*, a* and b* of the post-hydrogenation sample were greatly improved, to 99.26, −0.53, and 1.34, respectively.

Examples 15-26

For the following examples related to the use of color stabilizing additives as a mitigation measure, color development in FDME was determined over periods of accelerated degradation testing. In each test, a 10-gram sample of FDME was charged to a vial having 20 ml of air headspace. The vial was then placed in a heating block, set to the temperature at which color stability was to be measured. Once solid was melted and the desired temperature reached, a timer was activated and, following a predetermined time period of the test, the vial was removed and allowed to cool to ambient conditions. Approximately 240 mg of the solid was then dissolved in 3.76 grams of a 1:1 (w/w) mixture of isopropanol (IPA) and acetonitrile, which mixture was referred to as the "matrix" below. The solid and matrix were sonicated until complete dissolution, and the color of the solution was established using a Konica Minolta CM-5 colorimeter.

Tables 5-7 below show the results of tests performed on reference compositions, without a color stabilizing additive compound. The APHA color values and chromaticity coordinates L* a* b* were determined for (i) the matrix initially, (ii) the FDME initially, and (iii) FDME samples, following heating at 120° C. (248° F.) for 15 hours (Table 5), or at 150° C. (302° F.) for 15 hours (Table 6), or at 120° C. (248° F.) for 48 hours (Table 7).

TABLE 5

Matrix and FDME Color Data, 120° C., 15 h

| | Data Name | [Antioxidant] | L*(C) | a*(C) | b*(C) | APHA |
|---|---|---|---|---|---|---|
| Target | 1:1 IPA/Acetonitrile Matrix | 0 | 99.98 | 0 | 0 | 0 |
| — | FDME | 0 | 99.79 | −0.01 | 0.07 | 1 |
| 1 | FDME #1, 120° C., 15 h | 0 | 99.66 | 0.05 | 0.54 | 19 |
| 2 | FDME #2, 120° C., 15 h | 0 | 99.43 | −0.03 | 0.56 | 20 |
| 3 | FDME #3, 120° C., 15 h | 0 | 99.73 | −0.02 | 0.63 | 23 |
| 4 | FDME #4, 120° C., 15 h | 0 | 99.39 | −0.03 | 0.58 | 21 |
| 5 | FDME #5, 120° C., 15 h | 0 | 99.67 | −0.02 | 0.67 | 25 |
| — | Averege | | 99.58 | −0.01 | 0.60 | 22 |
| — | Standard Deviation | | 0.13 | 0.03 | 0.04 | 2 |

TABLE 6

| Matrix and FDME Color Data, 150° C., 15 h | | | | | | |
|---|---|---|---|---|---|---|
| | Data Name | Sample # | L*(C) | a*(C) | b*(C) | APHA |
| Target | 1:1 IPA/Acetonitrile Matrix | 0 | 100.01 | −0.01 | 0.02 | 0 |
| — | FDME | 0 | 98.79 | −0.01 | 0.07 | 1 |
| 1 | FDME #1, 150° C., 15 h | 1 | 99.74 | 0.07 | 0.56 | 21 |
| 2 | FDME #2, 150° C., 15 h | 2 | 98.89 | −0.09 | 0.65 | 24 |
| 3 | FDME #3, 150° C., 15 h | 3 | 99.91 | 0.03 | 0.56 | 20 |
| 4 | FDME #4, 150° C., 15 h | 4 | 99.74 | 0.01 | 0.58 | 21 |
| 5 | FDME #5, 150° C., 15 h | 5 | 98.76 | 0.04 | 0.68 | 25 |
| | Average | | 99.81 | 0.01 | 0.61 | 22 |
| | Standard Deviation | | 0.08 | 0.05 | 0.05 | 2 |

TABLE 7

| Matrix and FDME Color Data, 120° C., 48 h | | | | | | |
|---|---|---|---|---|---|---|
| | Data Name | Sample # | L*(C) | a*(C) | b*(C) | APHA |
| Target | 1:1 IPA/Acetonitrile Matrix | 0 | 99.98 | 0 | 0 | 0 |
| — | FDME | 0 | 99.79 | −0.01 | 0.07 | 1 |
| 1 | FDME #1, 120° C., 48 h | 1 | 99.99 | 0.00 | 0.72 | 24 |
| 2 | FDME #2, 120° C., 48 h | 2 | 99.86 | −0.02 | 0.78 | 25 |
| 3 | FDME #3, 120° C., 48 h | 3 | 99.79 | −0.01 | 0.92 | 32 |
| 4 | FDME #4, 120° C., 48 h | 4 | 99.42 | −0.04 | 0.82 | 26 |
| | FDME #5, 120° C., 48 h | | 99.84 | −0.01 | 0.76 | 25 |
| | Average | | 99.78 | −0.02 | 0.8 | 26 |
| | Standard Deviation | | 0.19 | 0.01 | 0.07 | 3 |

The initial FDME samples were obtained from a highly pure source, as is evident from the values in the second row of the Tables 5-7 above. However, following exposure to all temperatures tested for the respective time periods tested, the APHA color exceeded 10 and the chromaticity coordinate b* exceeded 0.5.

Color stabilizing additive compounds were then tested for their ability to prevent color development in FDME samples, during periods of accelerated degradation testing. The tests were performed as described above, except, prior to heating, each 10-gram sample of FDME was charged with a measured amount of additive to the vial. In the tables below, the APHA color values and chromaticity coordinates L* a* b* are shown as determined for (i) the matrix initially, (ii) the FDME initially, and (iii) FDME samples, following heating with varying wt-ppm levels of color stabilizing additive compounds. In particular, the results obtained for tests at 120° C. (248° F.) for 15 hours with BHA are shown in Table 8.

TABLE 8

| FDME with BHA Additive, 120°C, 15 h | | | | | | | | |
|---|---|---|---|---|---|---|---|---|
| | Data Name | [BHA] ppm | L*(C) | a*(C) | b*(C) | Δ b* | APHA | Δ APHA |
| Target | 1:1 IPA/Acetonitrile Matrix | 0 | 100 | 0 | 0 | — | 0 | — |
| — | FDME | 0 | 99.79 | −0.01 | 0.07 | — | 1 | — |
| 1 | FDME, 120° C., 15 h | 0 | 99.58 | −0.01 | 0.6 | — | 22 | — |
| 2 | FDME, 50 ppm BHA, 120° C., 15 h | 50 | 99.72 | 0 | 0.31 | 0.29 | 13 | 9 |
| 3 | FDME, 100 ppm BHA, 120° C., 15 h | 100 | 99.53 | −0.03 | 0.39 | 0.21 | 15 | 7 |
| 4 | FDME, 200 ppm BHA, 120° C., 15 h | 200 | 99.48 | −0.03 | 0.41 | 0.19 | 16 | 6 |
| 5 | FDME, 300 ppm BHA, 120° C., 15 h | 300 | 99.58 | −0.05 | 0.46 | 0.14 | 17 | 5 |
| 6 | FDME, 500 ppm BHA, 120° C., 15 h | 500 | 99.77 | −0.06 | 0.51 | 0.09 | 18 | 4 |
| 7 | FDME, 1500 ppm BHA, 120° C., 15 h | 1500 | 99.77 | −0.06 | 0.72 | −0.12 | 23 | −1 |

According to these results, BHA had a color stabilizing effect on FDME, particularly in view of the decreased values of APHA color the chromaticity coordinate b*, relative to the reference composition in the third row of the table above. At BHA additive amounts of 50-1500 ppm, APHA color was reduced to less than 10. At BHA additive amounts of 50-300 ppm, b* was reduced to less than 0.5.

The results obtained for tests at 130° C. (266° F.) for 6 hours with BHA are shown in Table 9.

TABLE 9

| FDME with BHA Additive, 130° C., 6 h | | | | | | | | |
|---|---|---|---|---|---|---|---|---|
| | Data Name | [BHA] ppm | L*(C) | a*(C) | b*(C) | Δ b* | APHA | Δ APHA |
| Target | 1:1 IPA/Acetonitrile Matrix | 0 | 99.99 | −0.01 | 0 | — | 0 | — |
| — | FDME | 0 | 99.79 | −0.01 | 0.07 | — | 1 | — |
| 1 | FDME, 130° C., 6 h | 0 | 98.75 | −0.03 | 0.13 | — | 2 | — |
| 2 | FDME, 50 ppm BHA, 130° C., 6 h | 50 | 99.81 | −0.01 | 0.04 | 0.09 | 0 | 3 |
| 3 | FDME, 100 ppm BHA, 130° C., 6 h | 100 | 99.76 | −0.01 | 0.06 | 0.07 | 1 | 2 |
| 4 | FDME, 200 ppm BHA, 130° C., 6 h | 200 | 99.78 | −0.02 | 0.09 | 0.04 | 1 | 2 |
| 5 | FDME, 300 ppm BHA, 130° C., 6 h | 300 | 99.79 | −0.02 | 0.11 | 0.02 | 2 | 1 |
| 6 | FDME, 1000 ppm BHA, 130° C., 6 h | 1000 | 99.72 | −0.01 | 0.22 | −0.09 | 10 | −7 |
| 7 | FDME, 500 ppm BHA, 130° C., 6 h | 500 | 99.78 | −0.41 | 0.42 | −0.29 | 15 | −12 |

These results further illustrate that BHA had a color stabilizing effect on FDME, particularly in view of the decreased values of APHA color the chromaticity coordinate b*, relative to the reference composition in the third row of the table above.

The results obtained for tests at 150° C. (302° F.) for 6 hours with BHA are shown in Table 10.

TABLE 10

| FDME with BHA Additive, 150° C., 6 h | | | | | | | | |
|---|---|---|---|---|---|---|---|---|
| | Data Name | [Antioxidant] ppm | L*(C) | a*(C) | b*(C) | Δ b* | APHA | Δ APHA |
| Target | 1:1 IPA/Acetonitrile Matrix | 0 | 99.99 | 0.01 | −0.01 | — | 0 | — |
| — | FDME | 0 | 99.79 | −0.01 | 0.07 | — | 1 | — |
| 1 | FDME, 150° C., 6 h | 0 | 99.71 | −0.08 | 0.58 | — | 15 | — |
| 2 | FDME, 50 ppm BHA, 150° C., 6 h | 50 | 99.77 | −0.01 | 0.05 | 0.53 | 1 | 14 |
| 3 | FDME, 100 ppm BHA, 150° C., 6 h | 100 | 99.80 | −0.02 | 0.07 | 0.51 | 1 | 14 |
| 4 | FDME, 200 ppm BHA, 150° C., 6 h | 200 | 99.82 | −0.04 | 0.14 | 0.44 | 3 | 12 |
| 5 | FDME, 300 ppm BHA, 150° C., 6 h | 300 | 99.79 | −0.06 | 0.16 | 0.42 | 4 | 11 |
| 6 | FDME, 400 ppm BHA, 150° C., 6 h | 400 | 99.75 | −0.07 | 0.24 | 0.34 | 9 | 6 |
| 7 | FDME, 600 ppm BHA, 150° C., 6 h | 600 | 99.60 | −0.10 | 0.30 | 0.28 | 11 | 4 |
| 8 | FDME, 1500 ppm BHA, 150° C., 6 h | 1500 | 99.58 | −0.13 | 1.10 | −0.52 | 39 | −24 |

These results further illustrate that BHA had a color stabilizing effect on FDME, particularly in view of the decreased values of APHA color the chromaticity coordinate b*, relative to the reference composition in the third row of the table above. At BHA additive amounts of 50-800 ppm, b* was reduced to less than 0.5. In addition, at BHA additive amounts of 50-500 ppm, APHA color was also reduced to less than 10.

The results obtained for tests at 150° C. (302° F.) for 6 hours with TBHQ are shown in Table 11.

TABLE 11

| FDME with TBHQ Additive, 150° C., 6 h | | | | | | | | |
|---|---|---|---|---|---|---|---|---|
| | Data Name | [Antioxidant] ppm | L*(C) | a*(C) | b*(C) | Δ b* | APHA | Δ APHA |
| Target | 1:1 IPA/Acetonitrile Matrix | 0 | 99.99 | 0.01 | −0.02 | — | 0 | — |
| — | FDME | 0 | 99.79 | −0.01 | 0.07 | — | 1 | — |
| 1 | FDME, 150° C., 6 h | 0 | 99.67 | −0.09 | 0.55 | — | 18 | — |
| 2 | FDME, 100 ppm TBHQ, 150° C., 6 h | 0 | 99.75 | −0.13 | 0.69 | −0.14 | 24 | −6 |
| 3 | FDME, 100 ppm TBHQ, 150° C., 6 h | 100 | 99.72 | −0.15 | 0.78 | −0.23 | 26 | −8 |
| 4 | FDME, 200 ppm TBHQ, 150° C., 6 h | 200 | 99.96 | −0.20 | 1.17 | −0.62 | 39 | −20 |
| 5 | FDME, 300 ppm TBHQ, 150° C., 6 h | 300 | 99.67 | −0.38 | 1.57 | −1.02 | 46 | −28 |
| 6 | FDME, 500 ppm TBHQ, 150° C., 6 h | 500 | 99.58 | −0.43 | 2.42 | −1.87 | 60 | −42 |
| 7 | FDME, 1500 ppm TBHQ, 150° C., 6 h | 1500 | 99.92 | −0.44 | 3.46 | −2.91 | 81 | −63 |

The results obtained for tests at 150° C. (302° F.) for 6 hours with DMP are shown in Table 12.

TABLE 12

| FDME with DMP Additive, 150° C., 6 h | | | | | | | | |
|---|---|---|---|---|---|---|---|---|
| | Data Name | Antioxidant ppm | L*(C) | a*(C) | b*(C) | Δ b* | APHA | Δ APHA |
| Target | 1:1 IPA/Acetonitrile Matrix | 0 | 100.01 | 0 | 0.01 | | 0 | |
| | FDME | 0 | 99.79 | −0.01 | 0.07 | | 1 | |
| 1 | FDME, 150° C., 6 h | 0 | 99.71 | −0.08 | 0.58 | | 15 | |
| 2 | FDME, 50 ppm DMP, 150° C., 6 h | 50 | 99.8 | 0.15 | 0.66 | −0.08 | 24 | −9 |
| 3 | FDME, 100 ppm DMP, 150° C., 6 h | 100 | 99.65 | 0.19 | 0.61 | −0.03 | 23 | −8 |
| 4 | FDME, 200 ppm DMP, 150° C., 6 h | 200 | 99.85 | 0.23 | 0.5 | 0.08 | 20 | −5 |
| 5 | FDME, 300 ppm DMP, 150° C., 6 h | 300 | 99.49 | 0.05 | 0.3 | 0.28 | 14 | 1 |
| 6 | FDME, 500 ppm DMP, 150° C., 6 h | 500 | 99.84 | 0.02 | 0.16 | 0.42 | 6 | 9 |
| 7 | FDME, 1500 ppm DMP, 150° C., 6 h | 1500 | 99.78 | −0.01 | 0.27 | 0.31 | 12 | 3 |

These results illustrate that DMP had a color stabilizing effect on FDME. At DMP additive amounts of 200-1500 ppm, the chromaticity coordinate b* was reduced to less than 0.5. At DMP additive amounts of about 500 ppm (e.g., from about 400 ppm to about 600 ppm), APHA color was also reduced to less than 10.

The results obtained for tests at 150° C. (302° F.) for 6 hours with DTMP are shown in Table 13.

TABLE 13

| FDME with DTMP Additive, 150° C., 6 h | | | | | | | | |
|---|---|---|---|---|---|---|---|---|
| | Data Name | [Antioxidant] ppm | L*(C) | a*(C) | b*(C) | Δ b* | APHA | Δ APHA |
| Target | 1:1 IPA/Acetonitrile Matrix | 0 | 99.99 | 0.00 | 0.00 | — | 0 | — |
| — | FDME | 0 | 99.79 | −0.01 | 0.07 | — | 1 | — |
| 1 | FDME, 150° C., 6 h | 0 | 99.71 | −0.08 | 0.58 | — | 15 | — |
| 2 | FDME, 50 ppm DTMP, 150° C., 6 h | 50 | 99.76 | 0.05 | 0.40 | 0.18 | 11 | 4 |
| 3 | FDME, 100 ppm DTMP, 150° C., 6 h | 100 | 99.59 | 0.14 | 0.38 | 0.20 | 11 | 4 |
| 4 | FDME, 200 ppm DTMP, 150° C., 6 h | 200 | 99.51 | 0.22 | 0.51 | 0.07 | 15 | 0 |
| 5 | FDME, 300 ppm DTMP, 150° C., 6 h | 300 | 98.95 | 0.18 | 0.63 | −0.05 | 23 | −8 |
| 6 | FDME, 500 ppm DTMP, 150° C., 6 h | 500 | 98.78 | 0.30 | 1.10 | −0.52 | 43 | −28 |
| 7 | FDME, 1500 ppm DTMP, 150° C., 6 h | 1500 | 98.34 | 0.45 | 1.89 | −1.31 | 66 | −51 |

These results illustrate that DTMP had a color stabilizing effect on FDME. At DTMP additive amounts of 50-100 ppm, the chromaticity coordinate b* was reduced to less than 0.5.

The results obtained for tests at 150° C. (302° F.) for 6 hours with XDPA are shown in Table 14.

TABLE 14

| FDME with XDPA Additive, 150° C., 6 h | | | | | | | | |
|---|---|---|---|---|---|---|---|---|
| | Data Name | [Antioxidant] ppm | L*(C) | a*(C) | b*(C) | Δ b* | APHA | Δ APHA |
| Target | 1:1 IPA/Acetonitrile Matrix | 0 | 100.01 | 0.00 | 0.01 | — | 0 | — |
| — | FDME | 0 | 99.79 | −0.01 | 0.07 | — | 1 | — |
| 1 | FDME, 150° C., 6 h | 0 | 99.71 | −0.08 | 0.58 | — | 15 | — |
| 2 | FDME, 50 ppm XDPA, 150° C., 6 h | 50 | 99.57 | 0.07 | 0.55 | 0.03 | 14 | 1 |
| 3 | FDME, 100 ppm XDPA, 150° C., 6 h | 100 | 99.93 | 0.19 | 0.41 | 0.17 | 12 | 3 |
| 4 | FDME, 200 ppm XDPA, 150° C., 6 h | 200 | 99.52 | 0.04 | 0.33 | 0.25 | 11 | 4 |
| 5 | FDME, 300 ppm XDPA, 150° C., 6 h | 300 | 99.64 | −0.04 | 0.41 | 0.17 | 12 | 3 |
| 6 | FDME, 500 ppm XDPA, 150° C., 6 h | 500 | 99.57 | −0.08 | 0.42 | 0.16 | 13 | 2 |
| 7 | FDME, 1500 ppm XDPA, 150° C., 6 h | 1500 | 99.73 | −0.05 | 0.34 | 0.24 | 12 | 3 |

These results illustrate that XDPA had a color stabilizing effect on FDME, particularly in view of the decreased values of APHA color the chromaticity coordinate b*, relative to the reference composition in the third row of the table above. At XDPA additive amounts of 100-1500 ppm, b* was reduced to less than 0.5.

The results obtained for tests at 150° C. (302° F.) for 6 hours with PETC are shown in Table 15.

TABLE 15

FDME with PETC Additive, 150° C., 6 h

| | Data Name | [Antioxidant] ppm | L*(C) | a*(C) | b*(C) | Δ b* | APHA | Δ APHA |
|---|---|---|---|---|---|---|---|---|
| Target | 1:1 IPA/Acetonitrile Matrix | 0 | 100.01 | 0.00 | 0.01 | — | 0 | — |
| — | FDME | 0 | 99.79 | −0.01 | 0.07 | — | 1 | — |
| 1 | FDME, 150° C., 6 h | 0 | 99.71 | 0.08 | 0.58 | — | 15 | — |
| 2 | FDME, 50 ppm PETC, 150° C., 6 h | 50 | 98.55 | 0.18 | 0.87 | −0.29 | 33 | −18 |
| 3 | FDME, 100 ppm PETC, 150° C., 6 h | 100 | 98.33 | 0.20 | 0.81 | −0.23 | 31 | −16 |
| 4 | FDME, 200 ppm PETC, 150° C., 6 h | 200 | 99.77 | 0.11 | 0.26 | 0.32 | 13 | 2 |
| 5 | FDME, 300 ppm PETC, 150° C., 6 h | 300 | 99.50 | 0.19 | 0.36 | 0.22 | 16 | −1 |
| 6 | FDME, 500 ppm PETC, 150° C., 6 h | 500 | 99.78 | 0.12 | 0.21 | 0.37 | 11 | 4 |
| 7 | FDME, 1500 ppm PETC, 150° C., 6 h | 1500 | 99.68 | 0.11 | 0.30 | 0.28 | 14 | 1 |

These results illustrate that PETC had a color stabilizing effect on FDME. At PETC additive amounts of 200-1500 ppm, the chromaticity coordinate b* was reduced to less than 0.5.

The results obtained for tests at 150° C. (302° F.) for 6 hours with Irganox®245 are shown in Table 16.

TABLE 16

FDME with Irganox ®245 Additive, 150° C., 6 h

| | Data Name | [Antioxidant] ppm | L*(C) | a*(C) | b*(C) | Δ b* | APHA | Δ APHA |
|---|---|---|---|---|---|---|---|---|
| Target | 1:1 IPA/Acetonitrile Matrix | 0 | 100.01 | 0.00 | 0.01 | — | 0 | — |
| — | FDME | 0 | 99.79 | −0.01 | 0.07 | — | 1 | — |
| 1 | FDME, 150° C., 6 h | 0 | 99.71 | −0.08 | 0.58 | — | 15 | — |
| 2 | FDME, 50 ppm Irganox 245, 150° C., 6 h | 50 | 99.62 | 0.08 | 0.22 | 0.36 | 10 | 5 |
| 3 | FDME, 100 ppm Irganox 245, 150° C., 6 h | 100 | 99.48 | 0.08 | 0.33 | 0.25 | 13 | 2 |
| 4 | EDME, 200 ppm Irganox 245, 150° C., 6 h | 200 | 99.65 | 0.04 | 0.40 | 0.18 | 16 | −1 |
| 5 | FDME, 500 ppm Irganox 245, 150° C., 6 h | 500 | 99.43 | 0.06 | 0.41 | 0.17 | 17 | −2 |
| 6 | FDME, 1500 ppm Irganox 245, 150° C., 6 h | 1500 | 99.60 | 0.01 | 0.50 | 0.08 | 19 | −4 |

These results illustrate that Irganox®245 had a color stabilizing effect on FDME. At Irganox®245 additive amounts of 50-1500 ppm, the chromaticity coordinate b* was reduced to less than 0.5. At Irganox®245 additive amounts of about 50 ppm (e.g., from about 50 ppm to about 100 ppm), APHA color was also reduced to 10.

The results obtained for tests at 150° C. (302° F.) for 6 hours with Irganox®B900 are shown in Table 17.

TABLE 17

FDME with Irganox ®B900 Additive, 150° C., 6 h

| | Data Name | [Antioxidant] ppm | L*(C) | a*(C) | b*(C) | Δ b* | APHA | Δ APHA |
|---|---|---|---|---|---|---|---|---|
| Target | 1:1 IPA/Acetonitrile Matrix | 0 | 100.01 | 0.00 | 0.01 | — | 0 | — |
| — | FDME | 0 | 99.79 | −0.01 | 0.07 | — | 1 | — |
| 1 | FDME, 150° C., 6 h | 0 | 99.71 | −0.08 | 0.58 | — | 15 | — |
| 2 | FDME, 50 ppm Irganox B900, 150° C., 6 h | 50 | 99.66 | −0.02 | 0.27 | 0.31 | 10 | 5 |
| 3 | FDME, 100 ppm Irganox B900, 150° C., 6 h | 100 | 99.61 | −0.05 | 0.25 | 0.33 | 10 | 5 |
| 4 | FDME, 200 ppm Irganox B900, 150° C., 6 h | 200 | 99.29 | −0.03 | 0.17 | 0.41 | 7 | 8 |
| 5 | FDME, 500 ppm Irganox B900, 150° C., 6 h | 500 | 99.74 | −0.04 | 0.22 | 0.36 | 8 | 7 |
| 6 | FDME, 1500 ppm Irganox B900, 150° C., 6 h | 1500 | 99.65 | −0.06 | 0.33 | 0.25 | 13 | 2 |

These results illustrate that Irganox®B900 had a color stabilizing effect on FDME, particularly in view of the decreased values of APHA color the chromaticity coordinate b*, relative to the reference composition in the third row of the table above. At Irganox®B900 additive amounts of 50-1500 ppm, b* was reduced to less than 0.5. In addition, at Irganox®B900 additive amounts of 50-500 ppm, APHA color was also reduced to 10 or less.

The results obtained for tests at 150° C. (302° F.) for 6 hours with Irganox®B225 are shown in Table 18.

TABLE 18

FDME with Irganox ®B225 Additive, 150° C., 6 h

| | Data Name | [Antioxidant] ppm | L*(C) | a*(C) | b*(C) | Δ b* | APHA | Δ APHA |
|---|---|---|---|---|---|---|---|---|
| Target | 1:1 IPA/Acetonitrile Matrix | 0 | 99.99 | 0 | 0 | | 0 | |
| | FDME | 0 | 99.79 | −0.01 | 0.07 | | 1 | |
| 1 | FEDME, 150°C, 6 h | 0 | 99.71 | −0.08 | 0.58 | | 15 | |
| 2 | FDME, 50 ppm Irganox B225, 150° C., 6 h | 50 | 99.76 | −0.01 | 0.17 | 0.41 | 7 | 8 |
| 3 | FDME, 100 ppm Irganox B225, 150° C., 6 h | 100 | 99.58 | −0.04 | 0.18 | 0.4 | 7 | 8 |
| 4 | FDME, 200 ppm Irganox B225, 150° C., 6 h | 200 | 99.81 | −0.02 | 0.24 | 0.34 | 9 | 6 |
| 5 | FDME, 500 ppm irganox B225, 150° C., 6 h | 500 | 99.85 | −0.06 | 0.26 | 0.32 | 9 | 6 |
| 6 | FDME, 1500 ppm Irganox B225, 150° C., 6 h | 1500 | 99.63 | −0.01 | 0.3 | 0.28 | 12 | 3 |

These results illustrate that Irganox®B225 had a color stabilizing effect on FDME, particularly in view of the decreased values of APHA color the chromaticity coordinate b*, relative to the reference composition in the third row of the table above. At Irganox®B225 additive amounts of 50-1500 ppm, b* was reduced to less than 0.5. In addition, at Irganox®B225 additive amounts of 50-500 ppm, APHA color was also reduced to less than 10.

Color stabilizing additive compounds were also tested for their ability to prevent color development in FDCA samples, during periods of accelerated degradation testing. In a first set of tests, a 300 mg sample of FDCA was dissolved in 9700 mg of triethylene glycol monomethyl ether (TEGMME) to provide a 3 wt-% solution. A reference composition of FDCA without any additive was heated to 100° C. (212° F.) for 2 hours in an air environment, after which time the composition was allowed to cool to ambient conditions. Compositions of various color stabilizing additive compounds alone, namely BHA, Irganox®245, Irganox®B900, Irganox®B225, Dovernox®10, and Dovernox®76 were subjected to these heating conditions. Also, each of these additives was combined with a composition comprising the 3 wt-% solution of FDCA as described above, at an addition level of 100 ppm, and the resulting stabilized compositions were also subjected to these heating conditions.

The color of the reference composition, additives alone, and stabilized FDCA compositions comprising 100 ppm of these additives, was established using a Konica Minolta CM-5 colorimeter. Table 19 below shows the APHA color values and chromaticity coordinates L* a* b* that were determined for the samples.

TABLE 19

FDCA, 3 wt-% in TEGMME, Stabilization with Various Additives, 100° C., 2 h

| AO | FDCA (wt. %) | AO (ppm) | Temp (° C.) | Time (min) | Gas | L* | a* | b* | APHA |
|---|---|---|---|---|---|---|---|---|---|
| — | — | — | — | — | Air | 99.99 | 0.03 | 0 | 0 |
| — | — | — | 100 | 120 | Air | 99.86 | 0.03 | 0.09 | 2 |
| — | 3 | — | 100 | 120 | Air | 99.54 | −0.90 | 2.11 | 102 |
| BHA | — | 100 | 100 | 120 | Air | 100 | 0.02 | 0.01 | 0 |
| BHA | 3 | 100 | 100 | 120 | Air | 99.81 | −0.41 | 0.86 | 25 |
| Irganox 245 | — | 100 | 100 | 120 | Air | 99.88 | 0.03 | 0.01 | 1 |
| Irganox 245 | 3 | 100 | 100 | 120 | Air | 99.67 | −0.44 | 1.01 | 31 |
| Irganox B900 | — | 100 | 100 | 120 | Air | 99.94 | 0.06 | 0.05 | 2 |
| Irganox B900 | 3 | 100 | 100 | 120 | Air | 99.76 | −0.33 | 0.94 | 27 |
| Irganox B225 | — | 100 | 100 | 120 | Air | 99.92 | 0.01 | 0.03 | 1 |
| Irganox B225 | 3 | 100 | 100 | 120 | Air | 99.89 | −0.48 | 0.79 | 24 |
| Dovernox 10 | — | 100 | 100 | 120 | Air | 99.84 | 0.02 | 0.01 | 1 |
| Dovernox 10 | 3 | 100 | 100 | 120 | Air | 99.79 | −0.61 | 1.20 | 46 |
| Dovernox 76 | — | 100 | 100 | 120 | Air | 99.80 | −0.01 | 0.04 | 2 |
| Dovernox 76 | 3 | 100 | 100 | 120 | Air | 99.91 | −0.53 | 0.68 | 21 |

These results illustrate that all tested additives had a color stabilizing effect on FDCA, particularly in view of the decreased values of APHA color the chromaticity coordinate b*, relative to the reference composition in the third row of the table above.

Additional tests were performed according to the procedures described above, but by dissolving a 100 mg sample of FDCA in 9900 mg of propylene glycol (PG) to provide a 1 wt-% solution. Varying amounts of additives were tested for their color stabilization of FDCA, and the APHA color values and chromaticity coordinates L* a* b* were determined as shown in Table 20 below.

TABLE 20

FDCA, 1 wt-% in PG, Stabilization with Various Additives, 100° C., 2 h

| FDCA (wt. %) | AO | AO (ppm) | Temp (° C.) | Time (min) | Gas | L* | a* | b* | APHA |
|---|---|---|---|---|---|---|---|---|---|
| — | — | — | — | — | Air | 99.99 | 0.01 | 0 | 0 |
| — | — | — | 100 | 120 | Air | 99.94 | −0.01 | 0.03 | 0 |
| 1 | — | — | 100 | 120 | Air | 99.75 | −0.91 | 1.87 | 81 |
| — | BHA | 100 | 100 | 120 | Air | 100 | −0.02 | 0 | 0 |
| 1 | BHA | 100 | 100 | 120 | Air | 99.87 | −0.26 | 0.49 | 26 |
| 1 | BHA | 500 | 100 | 120 | Air | 99.69 | −0.17 | 0.33 | 17 |
| — | Irganox 245 | 100 | 100 | 120 | Air | 99.88 | 0.02 | 0 | 0 |
| 1 | Irganox 245 | 100 | 100 | 120 | Air | 99.74 | −0.33 | 0.88 | 24 |
| 1 | Irganox 245 | 300 | 100 | 120 | Air | 99.71 | −0.34 | 0.96 | 27 |
| 1 | Irganox 245 | 600 | 100 | 120 | Air | 99.69 | −0.19 | 0.63 | 21 |
| 1 | Irganox 245 | 1000 | 100 | 120 | Air | 99.83 | −0.08 | 0.28 | 11 |
| — | Irganox B900 | 100 | 100 | 120 | Air | 99.91 | 0.04 | 0.01 | 1 |
| 1 | Irganox B900 | 100 | 100 | 120 | Air | 99.83 | −0.05 | 0.52 | 18 |
| 1 | Irganox B900 | 300 | 100 | 120 | Air | 99.81 | −0.11 | 0.64 | 20 |
| 1 | Irganox B900 | 600 | 100 | 120 | Air | 99.42 | −0.18 | 3.55 | 145 |
| 1 | Irganox B900 | 1000 | 100 | 120 | Air | 99.51 | −0.24 | 4.21 | 187 |
| — | Irganox B225 | 100 | 100 | 120 | Air | 99.96 | 0.01 | 0 | 0 |
| 1 | Irganox B225 | 100 | 100 | 120 | Air | 99.89 | 0.03 | 0.54 | 25 |
| — | Dovernox 10 | 100 | 100 | 120 | Air | 99.91 | 0.01 | 0.02 | 1 |
| 1 | Dovernox 10 | 100 | 100 | 120 | Air | 99.82 | −0.14 | 0.65 | 20 |
| — | Dovernox 76 | 100 | 100 | 120 | Air | 99.92 | 0.01 | 0.03 | 2 |
| 1 | Dovernox 76 | 100 | 100 | 120 | Air | 99.86 | −0.11 | 0.71 | 27 |
| 1 | Dovernox 76 | 300 | 100 | 120 | Air | 99.81 | −0.18 | 0.56 | 25 |

The chromaticity coordinate b* was reduced to less than 0.5 at BHA additive amounts of 100-500 ppm and at Irganox®245 additive amounts of about 1000 ppm (e.g., from about 800 ppm to about 1200 ppm).

What is claimed is:

1. A process for the determination of soluble aldehydes in a composition, wherein the composition comprises one or more of (a) 2,5-furandicarboxylic acid (FDCA), (b) terephthalic acid (TPA), (c) an ester of 2,5-furandicarboxylic acid and (d) an ester of terephthalic acid, and wherein the process comprises combining one or more diamine salts with the composition under conditions suitable for causing soluble aldehydes present in the composition to react with the added diamine salt or salts and form one or more imines, then analyzing the composition for the imines.

2. The process of claim 1, wherein the analyzing step comprises ultraviolet-visible spectroscopy.

3. The process of either of claim 1 or claim 2, wherein any soluble aldehydes present in the composition react with the added diamine salt or salts to such a degree that it can be determined whether soluble aldehydes in excess of 30 parts per million by weight were present in the composition prior to reaction with the added diamine salt or salts.

4. The process of claim 3, wherein any soluble aldehydes present in the composition react with the added diamine salt or salts to such a degree that it can be determined whether soluble aldehydes in excess of 10 parts per million by weight were present in the composition prior to reaction with the added diamine salt or salts.

5. The process of claim 4, wherein any soluble aldehydes present in the composition react with the added diamine salt or salts to such a degree that it can be determined whether soluble aldehydes in excess of 30 parts per billion by weight were present in the composition prior to reaction with the added diamine salt or salts.

6. The process of claim 1, wherein the composition is an in-process material sampled from a process for making the one or more of FDCA, TPA, ester of FDCA and ester of TPA, after an oxidation step to form one or more of FDCA and TPA.

7. The process of claim 6, further comprising altering the process for making the one or more of FDCA, TPA, ester of FDCA and ester of TPA responsive to a result of the analyzing step, treating the composition by selectively hydrogenating soluble aldehydes in the composition and/or by the addition of a color-stabilizing additive or additives to the composition or both altering the process for making the one or more of FDCA, TPA, ester of FDCA and ester of TPA and treating the composition.

8. The process of claim 1, further comprising forming the FDCA by dehydrating a hexose to obtain one or more furanic oxidation precursors of FDCA, oxidizing one or more of these furanic oxidation precursors of FDCA to form a crude oxidation product comprising FDCA, sampling the crude oxidation product in real time as the crude oxidation product is formed and analyzing the sampled crude oxidation product for the imines.

9. The process of claim 1, further comprising forming the TPA by oxidizing a feed composition which comprises p-xylene to form a crude oxidation product comprising TPA, sampling the crude oxidation product in real time as the crude oxidation product is formed and then analyzing the sampled crude oxidation product for the imines.

10. The process of claim 1, further comprising dehydrating a hexose to obtain one or more furanic oxidation precursors of FDCA, combining one or more of these furanic oxidation precursors of FDCA with p-xylene, oxidizing the combination of one or more of furanic oxidation precursors of FDCA with p-xylene to form a crude oxidation product comprising both of FDCA and TPA, sampling the crude oxidation product in real time as the crude oxidation product is formed and then analyzing the sampled crude oxidation product for the imines.

11. The process of claim 1, wherein prior to or during combination with the diamine salt, the composition is combined with a solvent chosen from methylene chloride and chloroform.

12. The process of claim 11, wherein the solvent is methylene chloride.

13. The process of claim 1, wherein the diamine salt is chosen selected from at least one of:

N,N'-dimethyl-p-phenylenediamine sulfate (DPPD sulfate);

N,N'-dimethyl-p-phenylenediamine dihydrogen chloride (DPPD dihydrogen chloride);

N,N'-dimethyl-p-phenylenediamine oxalate (DPPD oxalate);

N,N'-dimethyl-p-phenylenediamine hydrogen chloride (DPPD hydrogen chloride);

N,N'-dimethyl-o-phenylenediamine dihydrogen chloride (DOPD dihydrogen chloride);

N,N'-dimethyl-o-phenylenediamine sulfate (DOPD sulfate);

N,N'-dimethyl-o-phenylenediamine hydrogen chloride (DOPD hydrogen chloride);

N,N'-dimethyl-o-phenylenediamine dihydrogen chloride (DPBD dihydrogen chloride);

N,N'-dimethyl-p-phenylenediamine hydrogen chloride (DPBD hydrogen chloride); and N,N'-dimethyl-p-phenylenediamine sulfate (DPBD sulfate).

14. The process of claim 13, wherein the diamine salt is chosen selected from at least one of:

N,N'-dimethyl-p-phenylenediamine sulfate (DPPD sulfate);

N,N'-dimethyl-o-phenylenediamine dihydrogen chloride (DPBD dihydrogen chloride);

N,N'-dimethyl-p-phenylenediamine hydrogen chloride (DPBD hydrogen chloride); and N,N'-dimethyl-p-phenylenediamine sulfate (DPBD sulfate).

15. The process of claim 14, wherein the diamine salt is N,N'-dimethyl-p-phenylenediamine sulfate (DPPD sulfate).

16. A process for the monitoring of soluble aldehydes in a composition comprising (a) crude 2,5-furandicarboxylic acid (FDCA) from the oxidation of one or more furanic precursors of FDCA, (b) crude terephthalic acid (TPA) from the oxidation of p-xylene, (c) both 2,5-furandicarboxylic acid and terephthalic acid, (d) an ester of 2,5-furandicarboxylic acid (e) an ester of terephthalic acid or (f) esters of both 2,5-furandicarboxylic acid and terephthalic acid, said process comprising the steps of:

supplying a diamine salt and combining the same with the composition under conditions suitable for causing soluble aldehydes present in the composition to react with the diamine and form one or more imines; and determining by ultraviolet-visible spectroscopy whether an excessive level of soluble aldehydes is present in the composition; and responsive to the detection of an excessive level of soluble aldehydes in the composition, altering a process for making the composition or treating the composition by selectively hydrogenating soluble aldehydes in the composition and/or by the addition of a color-stabilizing additive or additives to the composition, or both altering a process for making the composition and treating the composition.

17. The process of claim 16, wherein the excessive level of soluble aldehydes is 30 parts per million by weight.

18. The process of claim 17, wherein the excessive level of soluble aldehydes is 10 parts per million by weight.

19. The process of claim 18, wherein the excessive level of soluble aldehydes is 30 parts per billion by weight.

20. The process of claim 16, wherein the composition is treated by selectively hydrogenating soluble aldehydes in the composition by reaction with hydrogen in the presence of a hydrogenation catalyst comprising at least a first noble metal.

21. The process of claim 20, wherein the hydrogenation catalyst comprises both the first noble metal and a second noble metal.

22. The process of claim 21, wherein the hydrogenation catalyst further comprises a promoter metal.

23. The process of claim 22, wherein the hydrogenation catalyst comprises from about 0.5 wt-% to about 5 wt-% ruthenium (Ru), from about 0.5 wt-% to about 5 wt-% tin (Sn) and from about 0.1 wt-% to about 1 wt-% platinum (Pt) on a carbon-containing solid support.

24. The process of claim 16, wherein the composition is treated by addition of a color stabilizing additive in the form of a substituted phenol.

25. The process of claim 24, wherein the substituted phenol is a methoxy-substituted phenol or a tert-butyl-substituted phenol.

26. The process of claim 16, wherein the composition is treated by the addition thereto of one or more color stabilizing additives selected from the group consisting of butylated hydroxyanisole (BHA); 2,6-dimethoxyphenol (DMP); 2,6-di-tert-butyl-4-methoxylphenol (DTMP); pentaerythritol tetrakis[3-[3,5-di-tert-butyl-4-hydroxyphenyl]propionate (PETC); 2-tert-butylhydroquinone (TBHQ); 4,4'-bis(α,α-dimethylbenzyl) diphenylamine (XDPA); ethylenebis (oxyethylene) bis-(3-(5-tert-butyl-4-hydroxy-m-tolyl)-propionate); tris(2,4-di-tert-butylphenyl)phosphite; octadecyl-3-(3,5-di-tert-butyl-4-hydroxyphenyl)-propionate and ascorbic acid.

27. The process of claim 26, wherein the color stabilizing additive or additives are added to the composition in an amount from about 50 to about 2000 parts per million by weight (wt-ppm) of the composition as a whole.

* * * * *